United States Patent
Michiie

(10) Patent No.: US 7,715,066 B2
(45) Date of Patent: *May 11, 2010

(54) DOCUMENT READING APPARATUS, IMAGE PROCESSING APPARATUS, IMAGE FORMING APPARATUS, AND COPYING MACHINE

(75) Inventor: Norio Michiie, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1060 days.

This patent is subject to a terminal disclaimer.

(21) Appl. No.: 11/357,188

(22) Filed: Feb. 21, 2006

(65) Prior Publication Data

US 2006/0208157 A1    Sep. 21, 2006

(30) Foreign Application Priority Data

Mar. 15, 2005    (JP) .............................. 2005/073934

(51) Int. Cl.
*H04N 1/04* (2006.01)
(52) U.S. Cl. .................. 358/474; 358/449; 358/1.2; 358/509; 358/475; 358/488; 382/274; 382/275; 250/208.1; 399/367; 399/371
(58) Field of Classification Search .............. 358/474, 358/487, 498, 475, 509, 497, 486, 488, 1.2, 358/449; 382/274, 275, 505; 250/208.1, 250/204; 399/367, 364, 371, 374
See application file for complete search history.

(56) References Cited

U.S. PATENT DOCUMENTS

| | | | |
|---|---|---|---|
| 4,978,992 A * | 12/1990 | Kusumoto et al. ............ 355/51 |
| 5,453,818 A * | 9/1995 | Maehara et al. ............... 399/14 |
| 5,640,467 A | 6/1997 | Yamashita et al. | |
| 5,722,029 A | 2/1998 | Tomidokoro et al. | |
| 5,973,797 A * | 10/1999 | Tanaka et al. ............... 358/488 |
| 5,987,227 A | 11/1999 | Endo et al. | |
| 6,226,102 B1 | 5/2001 | Koike et al. | |
| 6,597,470 B1 | 7/2003 | Tomidokoro | |
| 6,832,010 B2 * | 12/2004 | Miyazaki et al. ............ 382/305 |
| 6,833,928 B2 | 12/2004 | Tomidokoro | |
| 7,471,424 B2 * | 12/2008 | Ishido et al. ................ 358/449 |
| 2005/0141907 A1 | 6/2005 | Izumikawa et al. | |
| 2006/0028696 A1 * | 2/2006 | Michiie et al. .............. 358/474 |

FOREIGN PATENT DOCUMENTS

| | | |
|---|---|---|
| JP | 10-257255 | 9/1998 |
| JP | 2000-138798 | 5/2000 |
| JP | 2003-198809 | 7/2003 |
| JP | 2003-250028 | 9/2003 |

OTHER PUBLICATIONS

U.S. Appl. No. 09/195,604, filed Nov. 19, 1998, Nobuaki Tomidokoro, et al.

* cited by examiner

*Primary Examiner*—Negussie Worku
(74) *Attorney, Agent, or Firm*—Oblon, Spivak, McClelland, Maier & Neustadt, L.L.P.

(57) ABSTRACT

An opening detector detects a state of a platen whether the platen is "opened" at a level equal to or above a set opening degree or "closed" at a level less than the set opening degree. A reading controller starts lighting of an illumination lamp in response to a change of the state of the platen from the "opened" to the "closed". A rising detector detects a rising of light intensity of the illumination lamp. A size detector reads an image signal of an imaging element after the rising detector detects a rising of the light intensity, determines presence of a document in a main scanning direction, and decides a document size in the main scanning direction.

25 Claims, 25 Drawing Sheets

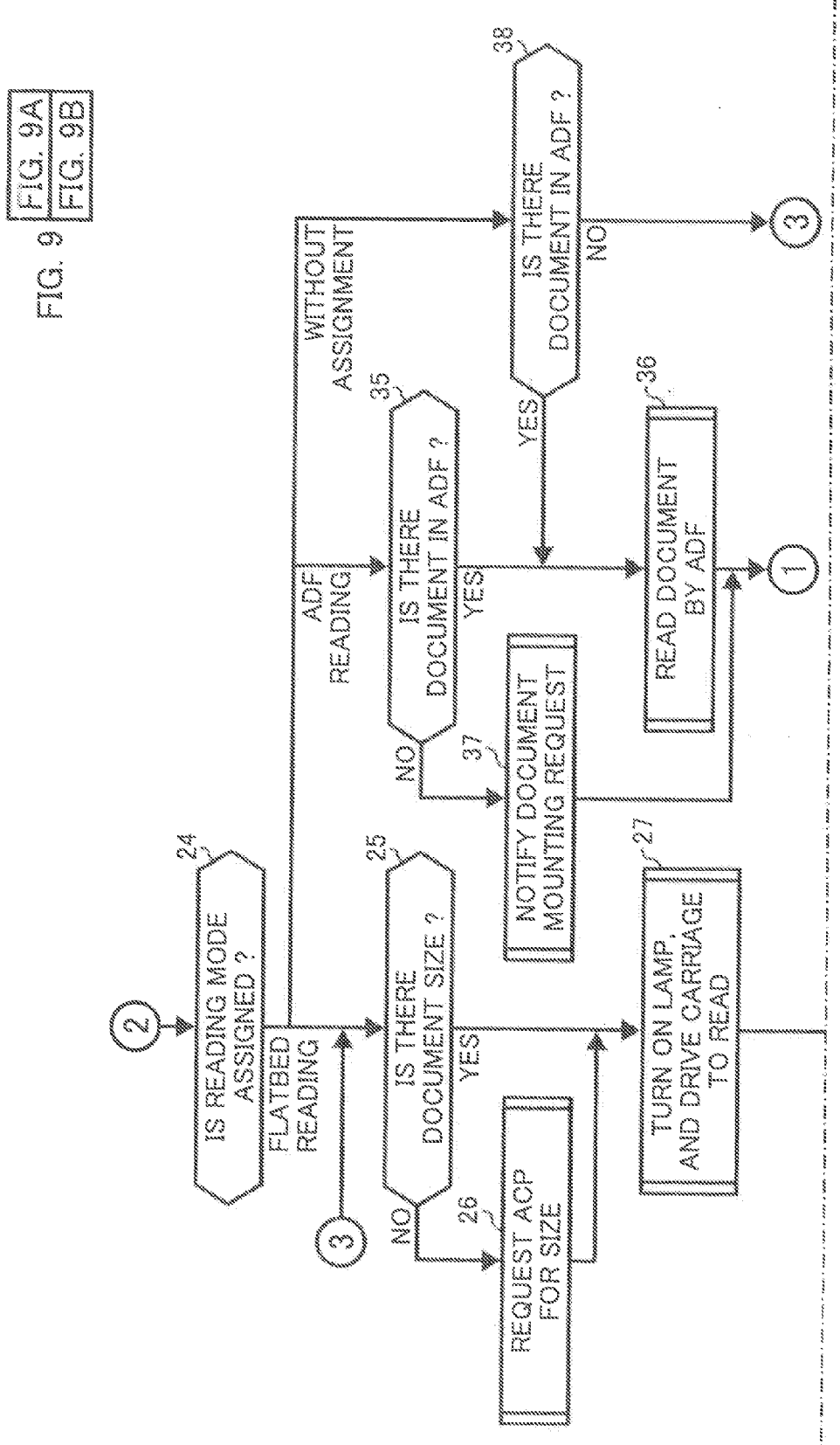

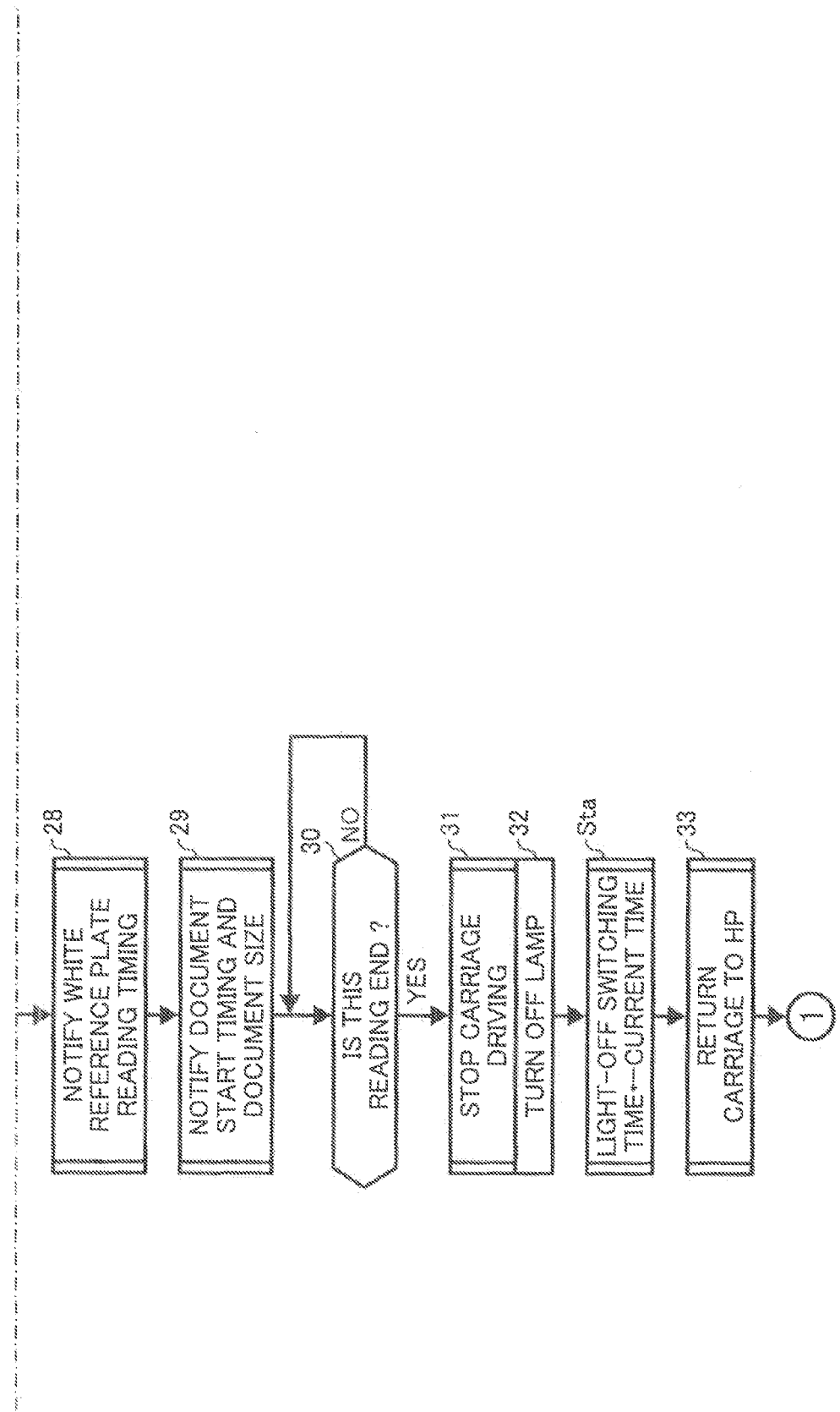

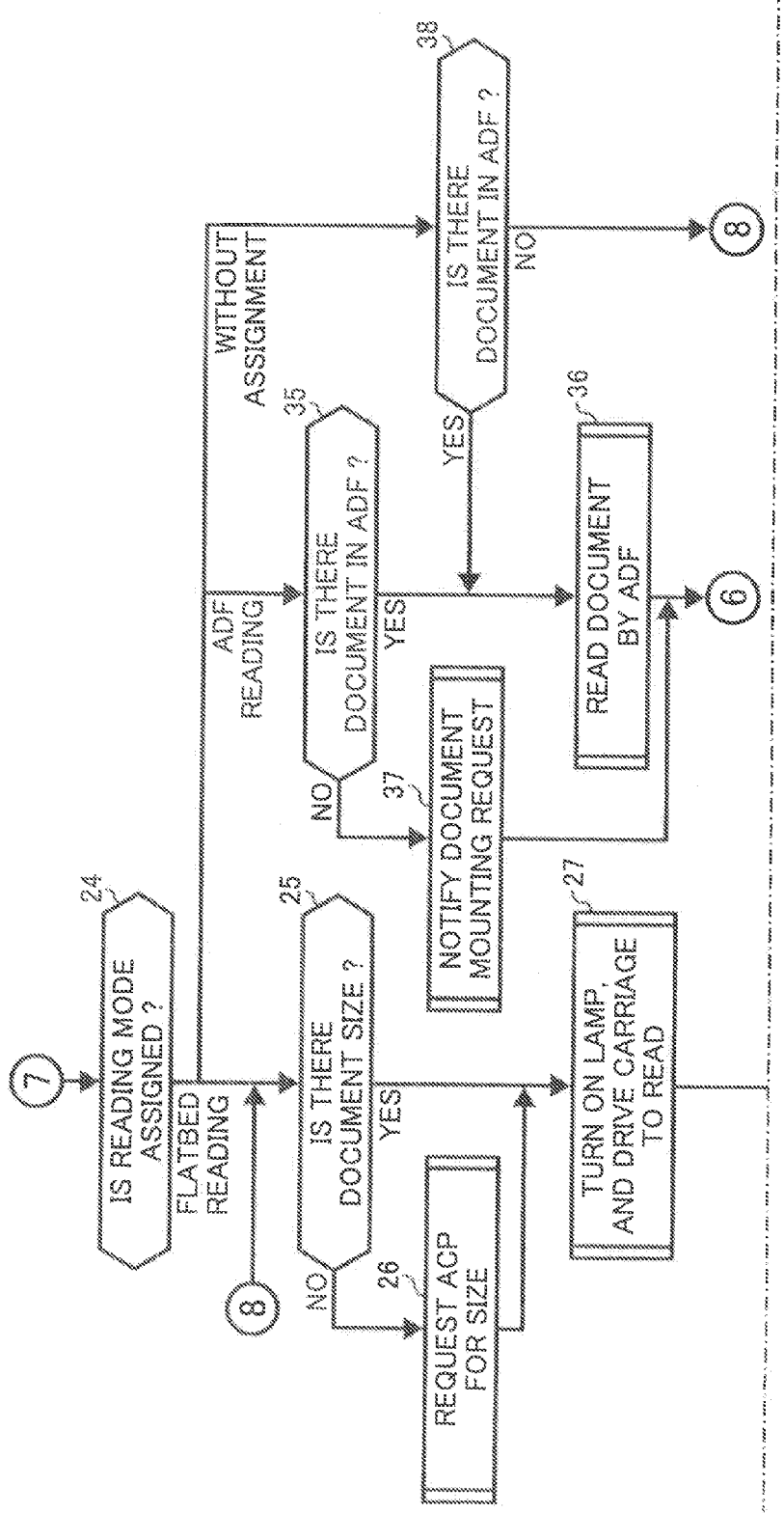

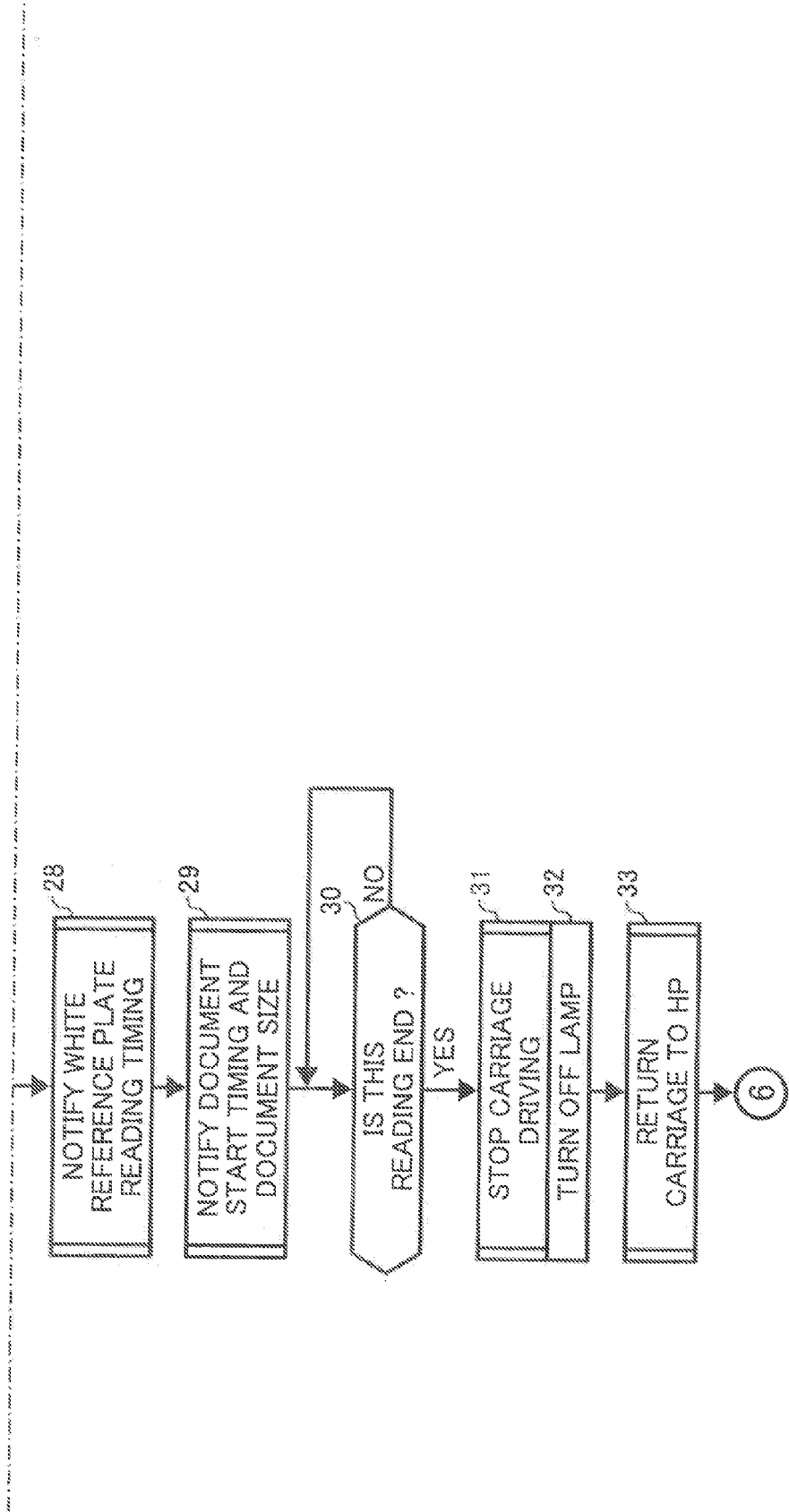

DOCUMENT READING APPARATUS, IMAGE PROCESSING APPARATUS, IMAGE FORMING APPARATUS, AND COPYING MACHINE

CROSS-REFERENCE TO RELATED APPLICATIONS

The present document incorporates by reference the entire contents of Japanese priority document, 2005-073934 filed in Japan on Mar. 15, 2005.

BACKGROUND OF THE INVENTION

1. Field of the Invention

The present invention relates to a technology for reading an image from a document pressed against a translucent plate with a platen and generating image data of the image.

2. Description of the Related Art

As one of representative image reading apparatuses that read an image from a document pressed against a translucent plate with a platen, there is a flatbed system document scanner that can read not only a sheet document but also a book document, and automatically detect a document size before completing a reading and scanning of the document. An infrared sensor is conventionally used to detect a document size in reading the document by the flatbed system. In recent years, to detect a document size in the main scanning direction, a line sensor (a charge-coupled device (CCD)) for reading a document image has come to be used instead of the infrared sensor. Detection of document sizes is necessary not only in the main scanning direction but also in a sub-scanning direction. To detect a document size in the sub-scanning direction, the whole surface of the document needs to be pre-scanned. When the whole surface of the document is pre-scanned, a delay occurs in reading the document. Therefore, in actual practice, the infrared sensor is used to detect a document size in the sub-scanning direction, like in the conventional practice, and the line sensor is used only to detect a document size in the main scanning direction.

Japanese Patent Application Laid-open No. H10-257255 describes a document size detecting apparatus that turns on an illumination lamp at the time of closing a document cover, reads a document image using a CCD sensor during a period from when the document cover is to be closed until when the document cover is brought into contact with the document, and that detects an edge of the document in the main scanning direction based on the read image data. Even when the document cover is to be closed, illumination light is reflected from a document area until when the document cover is substantially brought into contact with the document, and the CCD sensor can detect the document size under the light. However, the illumination light is not reflected to the CCD sensor in the area outside the document, and the CCD sensor detects this area as a dark area. A difference of this brightness appears in the edge of the document of the read image data.

Japanese Patent Application Laid-open No. 2000-138798 describes a document size detecting apparatus that drives an illumination lamp from a home position HP to a reading position when a document mat is opened, turns on the illumination lamp when the document mat is closed, thereby detecting a document size in the main scanning direction, and thereafter returns the illumination lamp to the home position. A reflection type optical sensor detects a size in the sub-scanning direction.

Japanese Patent Application Laid-open No. 2003-198809 describes a document size detecting apparatus that first turns on an illumination lamp in a state that a document platen is closed, reads data with a CCD line sensor by plural sampling areas in the main scanning direction, adds plural lines and determines presence of the document in the sampling areas, thereby obtaining a document size in the main scanning direction.

Japanese Patent Application Laid-open No. 2003-250028 describes an image forming apparatus that performs the following process. A first detector detects that a platen cover is being closed, and an exposure lamp is turned on. A scanner unit is moved in a sub-scanning direction, and an image sensor reads plural lines. A second detector detects completion of the platen cover. The exposure lamp is turned on again, and the scanner unit is moved in the opposite direction. The image sensor reads plural lines. The apparatus confirms a document size in the main scanning direction based on the total two sets of read information obtained by the scanning in forward and return directions. The apparatus detects a document size in a sub-scanning direction with a photo-sensor.

According to the system described in Japanese Patent Application Laid-open No. H10-257255, a document size in the main scanning direction is determined by assuming that the inside of the document is white and the outside of the document is black, when the platen is opened. When black is inside the document, a line sensor reading position is moved, and a document size is detected based on a white line within the document. The system described in Japanese Patent Application Laid-open No. 2000-138798 is the same as the system described in Japanese Patent Application Laid-open No. H10-257255 in that a document size in the main scanning direction is determined by assuming that the inside of the document is white and the outside of the document is black, when the platen is opened. However, data is obtained based on two conditions of when the lamp is turned on and when the lamp is turned off, and the influence of disturbance light is excluded. Both Japanese Patent Application Laid-open No. H10-257255 and Japanese Patent Application Laid-open No. 2000-138798 are effective in that precision of the detection of a document size is increased based on two or more kinds of read data. However, these two publications do not refer to a point of decreasing the time until when the platen is closed or the light does not excite user's eyes. The system described in Japanese Patent Application Laid-open No. 2003-198809 is the same as the system described in Japanese Patent Application Laid-open No. H10-257255 in that a document size in the main scanning direction is determined by assuming that the inside of the document is white and the outside of the document is black, when the platen is opened. However, a document size in the main scanning direction is detected using data read by the line sensor at plural points in the main scanning direction. According to the system described in Japanese Patent Application Laid-open No. 2003-198809, the time required until when the platen is closed is short. However, when the CCD line sensor reads the data, the light quantity of the lamp is in the middle of increasing, and the illumination light quantity can be unstable. Because the read data is simply averaged in the sub-scanning direction, the detection of a document size in the main scanning direction has a high risk of malfunctioning. The system described in Japanese Patent Application Laid-open No. 2003-250028 can have a problem similar to that of the system described in Japanese Patent Application Laid-open No. 2003-198809 at the first reading of data in the middle of closing the platen cover. At the second reading in the state that the platen cover is closed, the image on the document is read. Therefore, it is difficult to determine the size on the document. Furthermore, a size determining process based on the result of the first reading and the second reading can become complex.

While the user is closing the platen, when the document illumination lamp is turned on to detect a document size when the opening of the platen is large, the light of the lamp enters the user's eyes. Therefore, it is preferable to carry out the detection of the document size while the opening is as small as possible. However, when the detection is started while the opening is small, the platen is closed before the document size is successfully determined. This has a high possibility of a failure in determining the document size because the document cannot be discriminated from the white color of the surface below the platen. Consequently, it is necessary to turn on the lamp while the opening is small, and immediately detect the document size. However, the lamp to be used as the document illumination unit has a non-lighting time called a dark start when the lighting is started. It takes time for the light intensity to reach a predetermined value since the lamp is turned on. In general, the reading of a document is started after this dark start and the light intensity stabilization time passes. The dark start time has a large variation depending on environmental conditions such as brightness of the surrounding of the lamp and a temperature (a situation of an installation position), and a non-lighting period from the last lighting to the lighting this time. When the non-lighting period is long at a low-temperature and a dark position of small radiant ray like radiation, the dark start time is long. The dark start time is short at a high-temperature and a bright position of large radiant ray like radiation. For example, it takes about 300 ms as a maximum for the light intensity of a xenon lamp or a halogen lamp to be stabilized, and it requires a starting time of about 20 ms as a minimum for the light intensity to reach a level at which the document size can be detected.

Usually, by assuming a long dark start time, the lamp lighting is started when the platen has a relatively large opening. After a lapse of a setting time of the long dark start time since the lighting is started, the detection of the document size is started. As a result, in the environment of frequently reading the document at a short non-lighting interval in a warm and bright office, the document illumination light is quickly turned on at a relatively large opening when the platen is closed. Consequently, the lighting time of the document illumination lamp to detect the document size is long, and this has a high possibility of exciting the user's eyes. However, when the lighting starting timing of the document illumination lamp to detect the document size is delayed, the platen is substantially closed by the time when the light intensity of the document illumination lamp rises to a level suitable to detect the document size, immediately after the low-temperature and long non-lighting time. This has a high possibility of a failure in detecting the document size.

SUMMARY OF THE INVENTION

It is an object of the present invention to at least solve the problems in the conventional technology.

A document reading apparatus according to one aspect of the present invention includes a translucent plate; a platen that presses a document against the translucent plate; an illumination lamp that illuminates the document; a driving unit that drives the illumination lamp in a sub-scanning direction; an imaging element that reads the document in a main scanning direction, and line-outputs an image signal; an optical unit that projects a document image illuminated by the illumination lamp to the imaging element; an opening detector that detects a state of the platen whether the platen is "opened" at a level equal to or above a set opening degree or "closed" at a level less than the set opening degree; a reading controller that starts lighting of the illumination lamp in response to a change of the state of the platen from the "opened" to the "closed"; a rising detector that detects a rising of light intensity of the illumination lamp; and a size detector that reads the image signal of the imaging element after the rising detector detects a rising of the light intensity, determines presence of a document in the main scanning direction, and decides a document size in the main scanning direction.

An image processing apparatus according to another aspect of the present invention includes an image reading device including a translucent plate, a platen that presses a document against the translucent plate, an illumination lamp that illuminates the document, a driving unit that drives the illumination lamp in a sub-scanning direction, an imaging element that reads the document in a main scanning direction, and line-outputs an image signal, an optical unit that projects a document image illuminated by the illumination lamp to the imaging element, an opening detector that detects a state of the platen whether the platen is "opened" at a level equal to or above a set opening degree or "closed" at a level less than the set opening degree, a reading controller that starts lighting of the illumination lamp in response to a change of the state of the platen from the "opened" to the "closed", a rising detector that detects a rising of light intensity of the illumination lamp, and a size detector that reads the image signal of the imaging element after the rising detector detects a rising of the light intensity, determines presence of a document in the main scanning direction, and decides a document size in the main scanning direction; a memory unit that stores image data; and an image data processor that stores image data output from the image reading device into the memory unit, and reads the image data from the memory unit.

An image forming apparatus according to still another aspect of the present invention includes an image reading device including a translucent plate, a platen that presses a document against the translucent plate, an illumination lamp that illuminates the document, a driving unit that drives the illumination lamp in a sub-scanning direction, an imaging element that reads the document in a main scanning direction, and line-outputs an image signal, an optical unit that projects a document image illuminated by the illumination lamp to the imaging element, an opening detector that detects a state of the platen whether the platen is "opened" at a level equal to or above a set opening degree or "closed" at a level less than the set opening degree, a reading controller that starts lighting of the illumination lamp in response to a change of the state of the platen from the "opened" to the "closed", a rising detector that detects a rising of light intensity of the illumination lamp, and a size detector that reads the image signal of the imaging element after the rising detector detects a rising of the light intensity, determines presence of a document in the main scanning direction, and decides a document size in the main scanning direction; and a printer that prints an image formed by image data read by the image reading apparatus on a recording medium.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 9 is a flowchart of the rest of the outline of the contents of "reading control" (RCP) of the scanner control circuit shown in FIG. 5;

FIG. 19 is a flowchart of the rest of the outline of the contents of "reading control" (RCP) of the scanner control circuit according to the third embodiment.

DETAILED DESCRIPTION OF THE PREFERRED EMBODIMENTS

Exemplary embodiments of the present invention will be explained in detail below with reference to the accompanying drawings.

Figure 1:
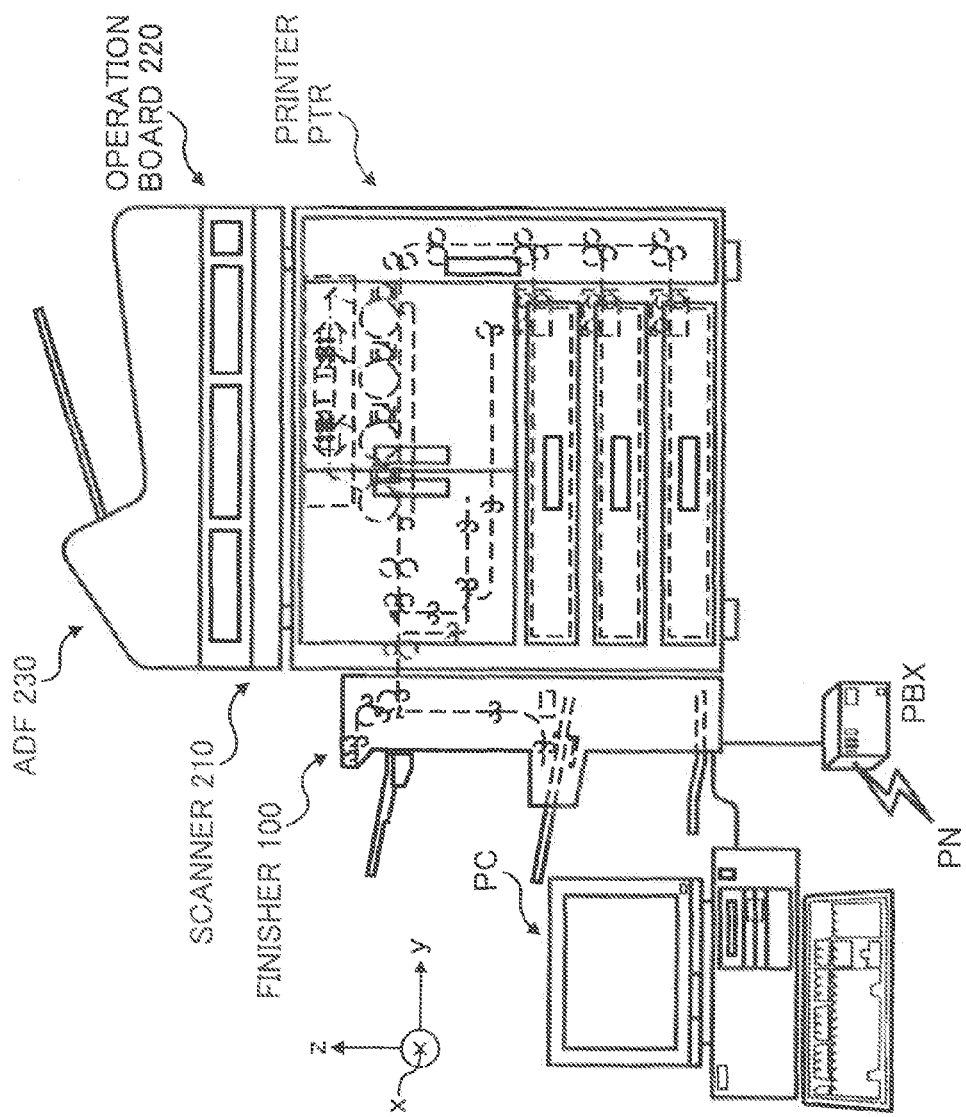
FIG. 1 is an enlarged front view of a full-color copying machine having a multiple image processing function according to a first embodiment of the present invention.

FIG. 1 is an enlarged front view of a multifunction full-color digital copying machine according to a first embodiment of the present invention. This full-color copying machine broadly includes an automatic document feeder (ADF) 230, an operation board 220, a color document scanner 210, a color printer PTR, and a finisher 100. The operation board 220, the color document scanner 210 having the ADF 230, and the finisher 100 can be separated from the printer PTR. The color document scanner 210 includes a control board having a power machine driver, a sensor input, and a controller. The color document scanner 210 communicates with an image data processing apparatus (an advanced control apparatus (ACP) (see FIG. 4), is timing-controlled, and reads a document image. A personal computer PC is connected to the image data processing apparatus ACP (see FIG. 4) of the copying machine via a local area network (LAN). A facsimile control unit FCU (see FIG. 4) is connected to a private branch exchange PBX connected to a telephone line PN (a facsimile communication line). Printed paper of the color printer PTR is discharged to the finisher 100.

Figure 2:
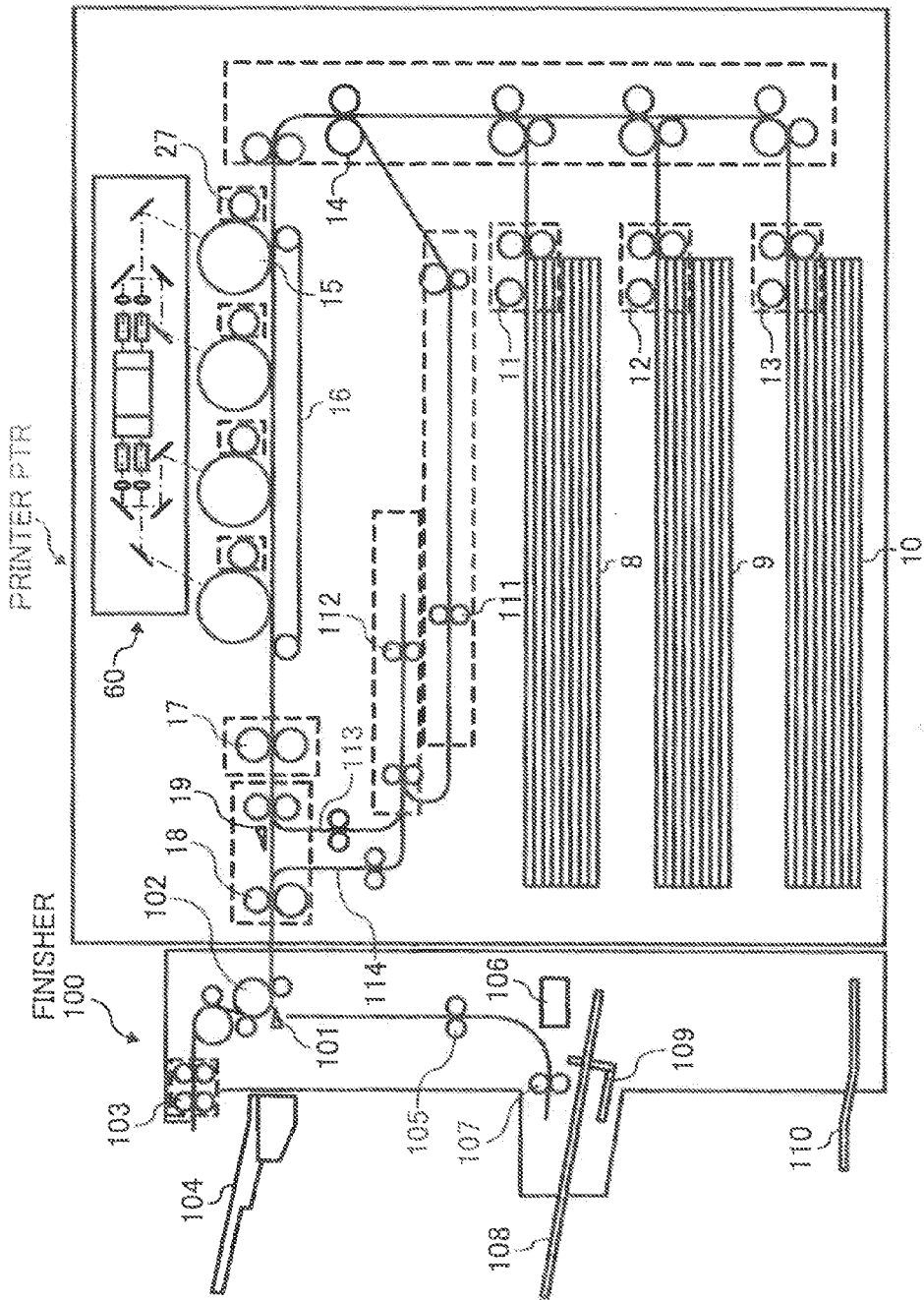
FIG. 2 is an enlarged vertical cross-section of a color printer shown in FIG. 1.

FIG. 2 is an enlarged vertical cross-section of the color printer PTR. The color printer PTR according to the present embodiment is a laser printer. An image creating unit that forms a toner image of one color includes a photoconductor 15, a developer 27, and a charger, a cleaning unit, and a transfer unit that are not shown in FIG. 2, as one set. Each one set of the image creating unit is available for each of black (Bk), cyan (C), magenta (M), and yellow (Y). Therefore, four sets of these units are available in total. These image creating units are laid out in tandem along a conveyor belt 16. Each toner image formed by these units is sequentially superimposed on one sheet of transfer paper, and the toner image is transferred onto the transfer paper.

Each transfer paper mounted on a first tray 8, a second tray 9, and a third tray 10 is supplied by a first paper feeder 11, a second paper feeder 12, and a third paper feeder 13, respectively. A vertical conveyor unit 14 conveys the paper to a position where the paper is brought into contact with the photoconductor 15. A scanner 50 reads image data. This image data is written onto the photoconductor 15 that is uniformly charged with a charger (not shown), using a laser light exposed from a writing unit 60, thereby forming an electrostatic latent image. This electrostatic latent image passes through a developing unit 27, and forms a toner image on the photoconductor 15. While the transfer paper is being conveyed with the conveyor belt 16 at an equal speed of the rotation of the photoconductor 15, the toner image on the photoconductor 15 is transferred onto the transfer paper. Thereafter, a fixing unit 17 fixes the image on the transfer paper. A paper discharging unit 18 discharges the transfer paper to the finisher 100 of a post-processing device.

The finisher 100 of the post-processing device shown in FIG. 2 can guide the transfer paper conveyed by the paper discharging unit 18 of the main body to a direction of a normal paper discharging roller 103 and a direction of a staple processor. By switching a switching plate 101 to an upward direction, the paper can be discharged to a side of a normal paper discharging tray 104 via the paper discharging roller 103. By switching the switching plate 101 to a downward direction, the paper can be transferred onto a staple table 108 via conveyor rollers 105 and 107. A jogger 109 that arranges the paper each time when a sheet of paper is discharged arranges the end surface of the transfer paper stacked on the staple table 108. Each time when the copying of a set of sheets of paper has been completed, a stapler 106 staples the set of paper. The set of transfer paper stapled with the stapler 106 is accommodated in a stapled discharge paper tray 110, based on the own weight of the set of paper.

On the other hand, the paper discharging tray 104 is a paper discharging tray that can be moved in forward and backward directions (directions perpendicular to the paper surface shown in FIG. 2). The paper discharging tray 104 that can be moved in forward and backward directions sorts the sheets of paper simply discharged, by moving forward and backward for each document or for each copy sorted based on the image memory.

In forming images on both sides of a sheet of transfer paper, the transfer paper fed from each of the paper feed trays 8 to 10 is not guided to the paper discharging tray 104. A branching claw 19 used to switch the paper path is turned downward, thereby temporarily guiding the paper to a paper inverting unit 112, and stocking the paper in a both-side paper feeding unit 111.

Thereafter, the transfer paper stocked on the both-side paper feeding unit 111 is fed again from the both-side paper feeding unit 111, to transfer a toner image formed on the photoconductor 15 onto the other side of the transfer paper. The branching claw 19 used to switch the path is returned to a horizontal direction shown in FIG. 2, thereby guiding the paper to the paper discharging tray 104. As described above, in preparing images on both sides of the transfer paper, the paper inverting unit 112 and the both-side paper feeding unit 111 are used.

The photoconductor 15, the conveyor belt 16, the fixing unit 17, the paper discharging unit 18, and the developing unit 27 are driven by a main motor (not shown). The driving force of the main motor is transferred to each of the paper feeders 11 to 13, with paper feeding clutches (not shown), thereby driving the paper feeders 11 to 13. The driving force of the main motor is also transferred to the vertical conveyor unit 14, with an intermediate clutch (not shown), thereby driving the vertical conveyor unit 14.

Figure 3:
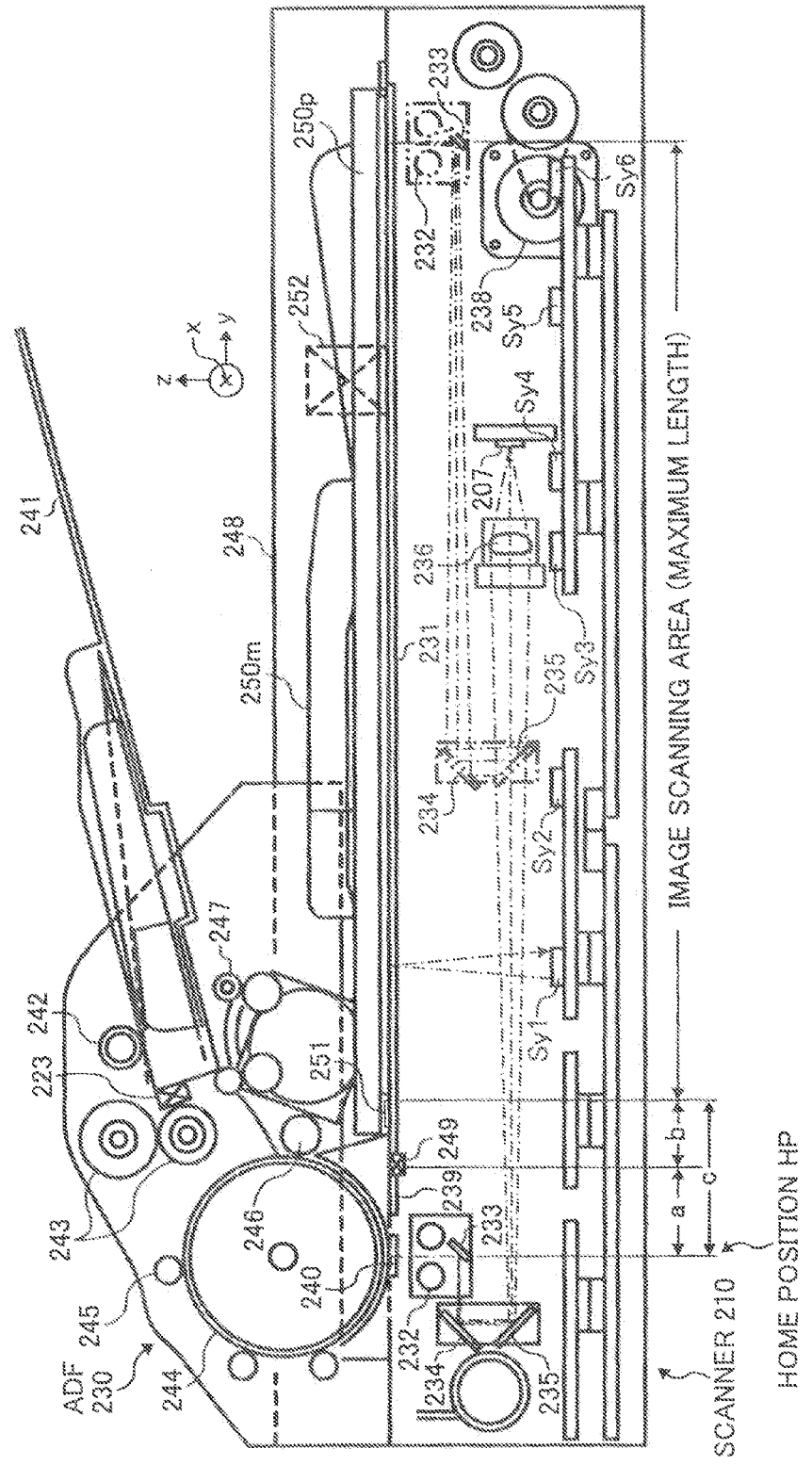
FIG. 3 is an enlarged vertical cross-section of a color document scanner and an automatic document feeder (ADF) shown in FIG. 1.

FIG. 3 is a configuration diagram of the color document scanner 210 and a document image reading mechanism of the ADF 230 mounted on the color document scanner 210. A document mounted on a contact glass 231 of the color document scanner 210 is illuminated with an illumination lamp 232. A reflection light of the document (an image light) is reflected to a direction parallel with a sub-scanning direction y with a first mirror 233. The illumination lamp 232 and the first mirror 233 are mounted on a first carriage (not shown) that is driven at a constant speed to the sub-scanning direction y. A second mirror 234 and a third mirror 235 are mounted on a second carriage (not shown) that is driven at a half speed of that of the first carriage in the same direction. An image light reflected by the first mirror 233 is reflected to a downward direction z with the second mirror 234, and is reflected to the sub-scanning direction y with the third mirror 235. The reflected light is converged with a lens 236, irradiated by a CCD 207, and is converted into an electric signal. The first and the second carriages are driven forward (a document scanning direction) and are returned in the y direction, based on the driving force of a sub-scanning driving motor 238. As explained above, the color document scanner 210 is a flatbed type document scanner that scans the document on the contact glass 231 with the illumination lamp 232 and the first mirror 233, and projects the document image onto the CCD 207. To make it possible to achieve a sheet-through reading as well, a reading glass 240 as a sheet-through reading window is available at a reading view field of the first mirror 233 when the first carriage is stopped at the home position HP. The ADF 230 is mounted on the reading glass 240, and a conveyor drum (platen) 244 of the ADF 230 faces the reading glass 240.

The document mounted on a document tray 241 of the ADF 230 is fed into between the conveyor drum 244 and a pressing roller 245 with a pickup roller 242 and a pair of resist rollers 243. The document is brought into close contact with the conveyor drum 244, and passes on the reading glass 240. The document is then discharged onto a paper discharge tray that also works as a platen below the document tray 241, with paper discharging rollers 246 and 247.

When passing on the reading glass 240 as a document reading window, the image on the surface of the document is illuminated by the illumination lamp 232 that moves immediately below. The light reflected from the surface of the document is irradiated onto the CCD 207 via the optical system below the fist mirror 233, and is photo-electrically converted. In other words, the light is converted into each color image signal of R, G, and B. The surface of the conveyor drum 244 is a white backboard facing the reading glass 240, and has a white color to form a white reference surface.

A reference white plate 239 and a reference point sensor 249 that detects the first carriage are present between the reading glass 240 and a positioning scale 251 at a document starting point. The reference white plate 239 is provided to correct a phenomenon of a variation in the read data although a document of uniform density is read (a shading correction), due to a variation in individual light-emission intensity of the illumination lamp 232, a variation in the main scanning direction, and a variation in the sensitivity of each pixel of the CCD 207.

A base 248 of the ADF 230 is hinge connected to the base of the color document scanner 210 at a back side (the back side of the paper surface in FIG. 3). By lifting the base 248 of the ADF 230 with a knob 250m at the front of the base 248 (the front side of the paper surface in FIG. 3), the ADF 230 can be erected to a posture forming an angle of about 60 degrees from the contact glass 231. At the back side of the base 248 of the ADF 230, there is provided a platen-opening detecting switch 252 that generates a high-level H signal indicating "open" when the base 248 of the ADF 230 forms a large opening of about 20 degrees or more from the contact glass 231, and a low-level L signal indicating "closed" when the base 248 of the ADF 230 forms a small opening of smaller than about 20 degrees from the contact glass 231. A platen 250p that faces the contact glass 231 of the ADF 230 is mounted on the bottom of the ADF 230. When the opening of the ADF 230 is zero degree, the lower surface of the platen 250p is in close contact with the upper surface of the contact glass 231 as shown in FIG. 3.

When the opening detection signal of the platen-opening detecting switch 252 is H that indicates "open" and when the ADF 230 is opened by about 60 degrees, the light of the illumination lamp 232 enters the user's eyes when the illumination lamp 232 is turned on at a position lower than the contact glass 231 visible from the user. However, when the opening detection signal of the platen-opening detecting switch 252 is L that indicates "closed" and when the ADF 230 is opened by about less than 20 degrees, the light of the illumination lamp 232 does not enter the user's eyes even when the illumination lamp 232 is turned on at a position lower than the contact glass 231 visible from the outside, because the light is interrupted by the platen 250p.

Figure 13:
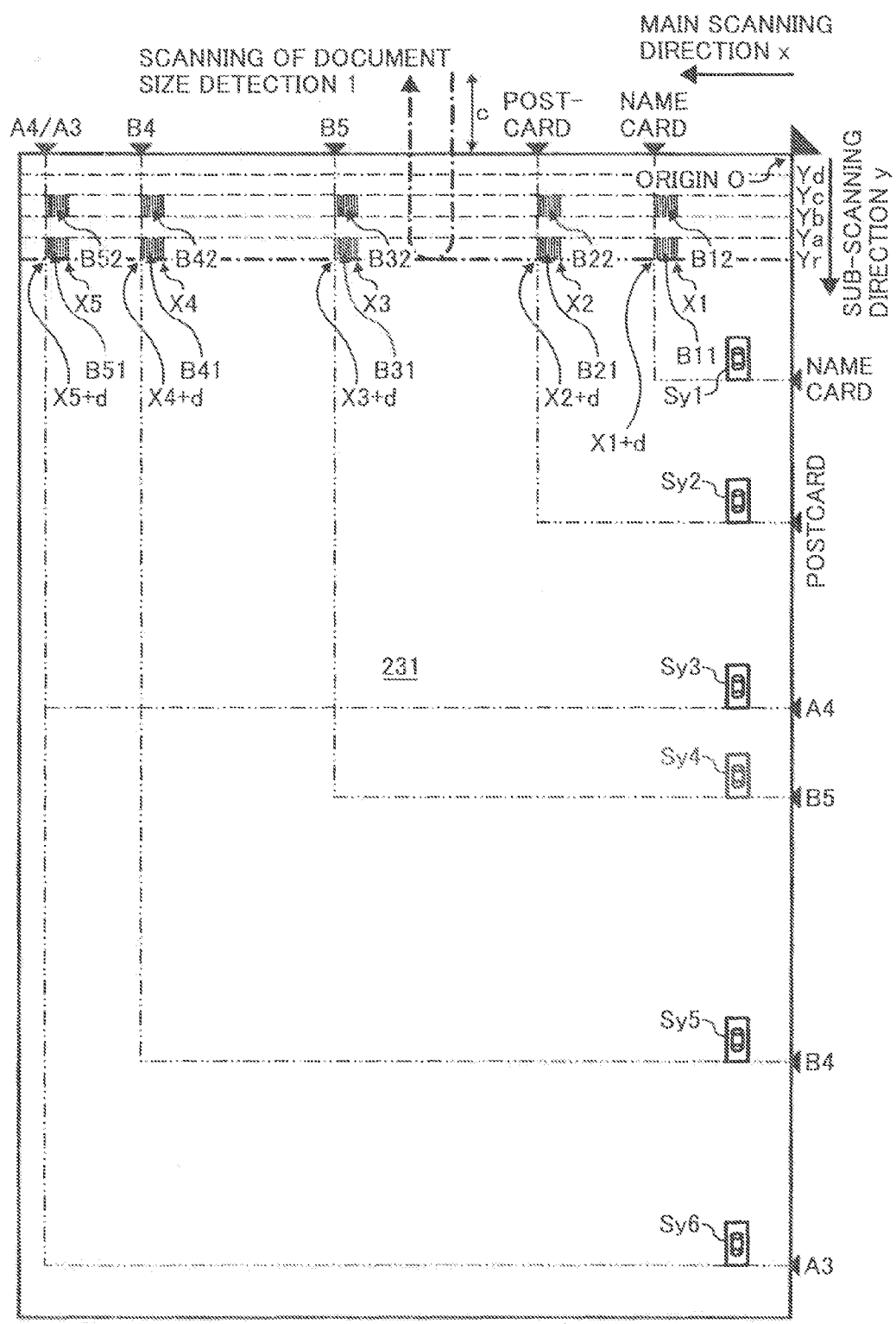
FIG. 13 is an enlarged top plan view of a contact glass shown in FIG. 3, covering parts at which image data is extracted in a first detection of a document size.

Reflection type optical sensors Sy1 to Sy6 that are used to determine a document size in the sub-scanning direction y are disposed at positions not buffering the move of the first carriage and the second carriage in the sub-scanning direction, at the downstream of the reciprocal path of these carriages in the sub-scanning direction. Detection positions of these sensors in a direction z perpendicular to the contact glass 231 are set on the upper surface of the contact glass 231 (the glass contact surface of the document mounted on the contact glass 231). Disposition positions of the reflection type optical sensors Sy1 to Sy6 on the s and y two-dimensional surface are shown in FIG. 13 (an enlarged top-plan view of the contact glass 231 faced in the z downward direction). According to the present embodiment, the reflection type optical sensors Sy1 to Sy6 detect whether paper (a document) is present at a position corresponding to the rear edge of a name, a post card, A4 paper (horizontal), B5 paper (vertical), B4 paper (vertical), and A3 paper (vertical) in the sub-scanning direction, respectively. Each of the reflection type optical sensors Sy1 to Sy6 generates a document detection signal of the high level H indicating that a document is present when paper is present at the detection point on the contact glass 231 (when the optical sensor receives a reflection light of the emitted light), and generates a document detection signal of the low level L indicating that a document is not present when paper is absent at the detection point on the contact glass 231 (when the optical sensor does not receive a reflection light of the emitted light). When the base 248 of the ADF 230 has an opening of less than 20 degrees, and when there is no document and the platen 250p is above the contact glass 231 by a few millimeters or more from the upper surface of the contact glass 231, the light emitted from each of the reflection type optical sensors Sy1 to Sy6 and reflected from the platen 250p does not return to the sensor. Consequently, the document detection signal generated from the sensor is the low-level L signal indicating absence of a document. When a document is on the contact glass 231, a document detection signal of the sensor at this position is the high-level H signal indicating presence of the document, even when the base 248 is opened or closed.

Figure 4:
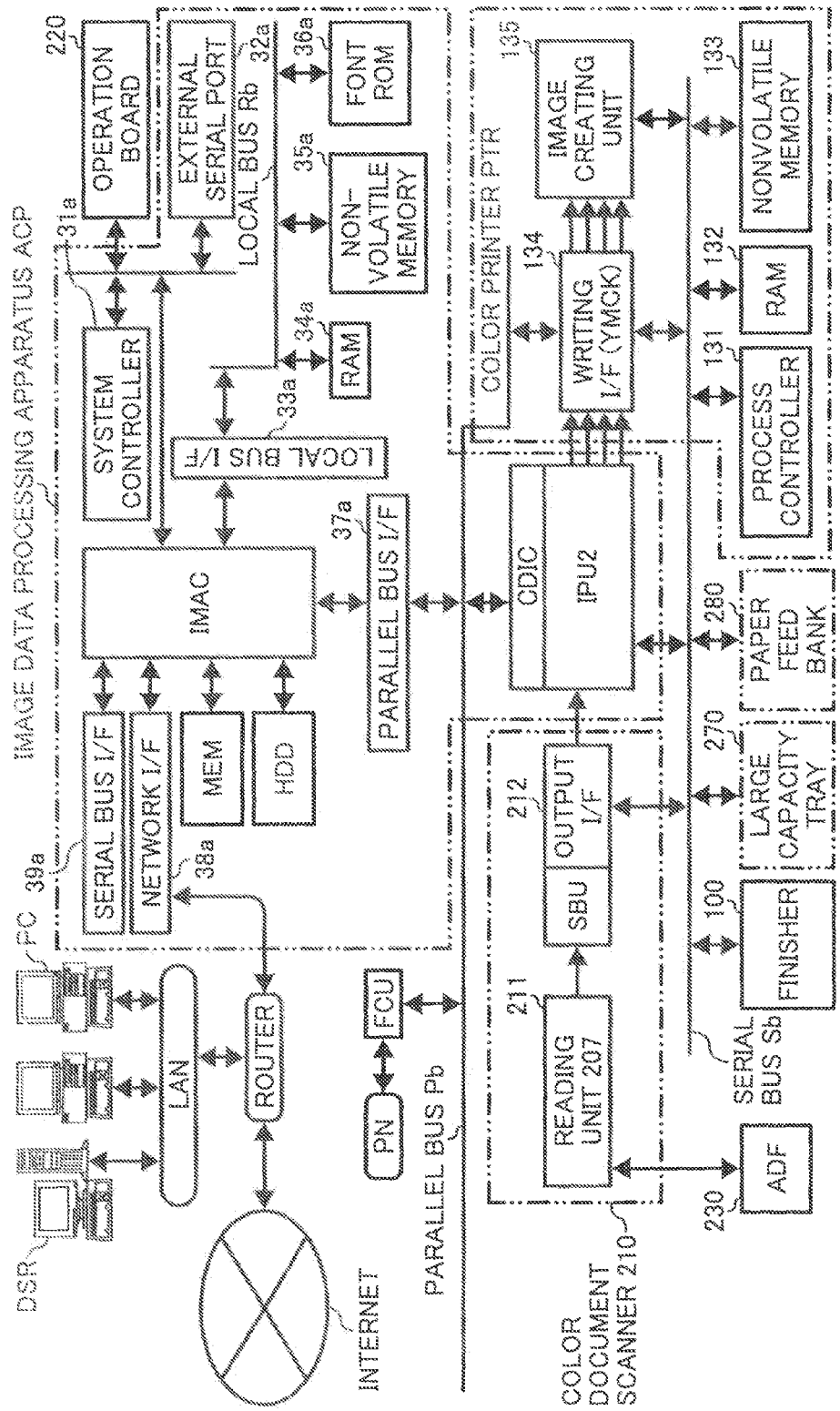
FIG. 4 is a block diagram of a configuration of an image processing system within the copying machine shown in FIG. 1.

FIG. 4 is a system configuration diagram of the image processing system of the copying machine shown in FIG. 1. In this system, the color document scanner 210 including a reading unit 211 and an image data interface (I/F) 212 is connected to a color document I/F control CDIC (hereinafter, simply CDIC) of the image data processor ACP. A color printer PTR is connected to the image data processor ACP. The color printer PTR receives YMCK record image data into a writing I/F 134 from a second image processing unit IPU 2 (hereinafter, "IPU 2") of the image data processor ACP, and prints out the image data with an image creating unit 135. The image creating unit 135 is shown in FIG. 2.

The image data processor ACP (see FIG. 4) is connected to a router. A hub (not shown) of the LAN to which a personal computer PC is connected and a modem (not shown) connected to the Internet are connected to the router. The image data processor ACP can transmit and receive image data, by communicating with a device connected to the LAN, such as the personal computer PC, a server DSR, a printer, and a multifunction copying machine. The image data processor ACP can also transmit and receive image data, by communicating with other devices having the function of communicating through the Internet. The distribution server DSR connected to the hub of the LAN is a computer that distributes received and stored files of messages and images to designated or registered destinations such as a device connected to the LAN and a device connected to the Internet.

The image data processor ACP (hereinafter, simply ACP) includes a parallel bus Pb, an image memory access control IMAC (hereinafter, simply IMAC), an image memory MEM (a memory module, hereinafter, simply MEM), a hard disk HDD (hereinafter, simply HDD), a system controller 31a, a random access memory (RAM) 34, a nonvolatile memory 35, a font read-only memory (ROM) 36a, the CDIC, and the IPU 2. A facsimile control unit FCU (hereinafter, simply FCU) is connected to the parallel bus Pb. The operation board 220 is connected to the system controller 31a.

The RGB image signal generated by the imaging element of the CCD 207 of the reading unit 211 of the color document scanner 210 that optically reads the document is signal-processed on the sensor board unit SBU. The RGB image signal is converted into RGB image data, and is shading-corrected, and the result is transmitted to the CDIC via an output I/F 214.

The CDIC carries out a data transfer between the output I/F 214, the parallel bus Pb, and the IPU 2 regarding the image data, and communicates with a process controller 131 and the system controller 31a that controls the total of the ACP. The RAM 132 is used as a work area of the process controller 131. The nonvolatile memory 133 stores an operation program and the like of the process controller 131. The HDD is available to store much image data, in addition the semiconductor memory MEM. When the HDD is used, an external power supply is not necessary, and images can be stored permanently. The scanner reads images of many documents, stores the images into the HDD, and can hold many document images given by the PC.

The IMAC includes hardware and software equivalent to those of the personal computer, controls writing and reading of image data and control data to and from the MEM and the HDD, and is set up with a www server (software), a file protocol transfer (FTP) server (software), a simple mail transfer protocol (SMTP) server (software), a dynamic host configuration protocol (DHCP) server (software), and a server (software) used to transmit and receive other files and mails. This software is stored in the HDD.

The system controller 31a controls the operation of each constituent part connected to the parallel bus Pb. The RAM 34 is used as a work area of the system controller 31a. The nonvolatile memory 35 stores the operation program and the like of the system controller 31a.

The operation board 220 is used to input the processing performed by the ACP. For example, types of processing, such as copying, facsimile transmission, image reading, and printing, and number of pieces of sheets of paper to be processed are input. Image data control information can be input from the operation board 220.

The RGB image data read by the color document scanner 210 and the CCD 207 of the ADF is stored into the MEM after the IPU 2 executes the image processing such as a scanner gamma correction and a filter process to correct a reading error. In printing the image data of the MEM, the IPU 2 converts an RGB signal into a YMCK signal, and executes an image quality process like a tone process, such as a printer gamma conversion, a tone conversion, and a dither process or an error diffusion process. The IPU 2 transfers the image data after the image quality processing to the writing I/F 134. The writing I/F 134 laser controls the tone-processed signal based on a pulse width and a power modulation. Thereafter, the image data is transferred to the image creating unit 135. The image creating unit 135 forms a reproduced image on the transfer paper.

The IMAC executes access control of the image data to the MEM and the HDD, development of print data of the personal computer PC (hereinafter, simply "the PC") connected to the LAN, secondary compression and expansion of image data for effective utilization of the MEM and the HDD, generation of image data using various kinds of servers (software), and transmission and reception of data via the LAN or the Internet, based on the control carried out by the system controller 31a.

The image data transmitted to the IMAC is compressed, and is then stored in the MEM or the HDD. The stored image data is read when necessary. The image data read to be printed is expanded, is returned to primary compressed, and is returned from the IMAC to the CDIC via the parallel bus Pb. The CDIC executes primary expansion of the image data to return the image data to the original image data. After the image data is transferred from the CDIC to the IPU 2, the image data is image-quality processed, and is output to the writing I/F 134. The image creating unit 135 forms a reproduction image on the transfer paper. In transmitting the image data via the LAN or the Internet, the secondary compressed data, or the data compressed by other compression method in high compatibility with the PC, is transmitted to the LAN or the Internet via a network I/F 38a or a router.

In the flow of the image data, the functions of the digital multifunction product are realized by executing bus control of the parallel bus Pb and the CDIC. Facsimile transmission is carried out as follows. The IPU 2 executes the image processing of the image data read by the color document scanner 210 and the ADF 230, and transfers the image data to the FCU via the CDIC and the parallel bus Pb. The FCU executes data conversion of the image data to a communication network, and transmits the data to a public network PN as facsimile data. Facsimile reception is carried out as follows. The FCU converts the circuit data from the public network PN into image data, and transfers the image data to the IPU 2 via the parallel bus Pb and the CDIC. In this case, a special image processing is not carried out. The writing I/F 134 outputs the image data, and the image creating unit 135 forms a reproduction image on the transfer paper.

In the state that plural jobs such as the image reading function, the copying function, the facsimile transmission and reception function, and the printer output function operate in parallel, the system controller 31a and the process controller 131 control the allocation of the right of using the reading unit 211, the image creating unit 135, and the parallel bus Pb to the jobs. The process controller 131 controls the flow of the image data. The system controller 31a controls the total system, thereby managing the starting of each resource (job). A user selects each function of the digital multifunction product from the operation board 220. The user inputs a selection of each function from the operation board 220 to set each of the image reading function, the image data registering function, the copying function, the printing function, the facsimile function, and the sequential transfer function.

The system controller 31a and the process controller 131 communicate with each other via the parallel bus Pb, the CDIC, and the serial bus Sb. Specifically, the system controller 31a and the process controller 131 communicate with each other by converting the data format of the data and the I/F between the parallel bus Pb and the serial bus Sb within the CDIC.

Various kinds of bus I/Fs such as a parallel bus I/F 37a, a serial bus I/F 39a, a local bus I/F 33AA, and a network I/F 38a, are connected to the IMAC. The system controller 31a is connected to a relevant unit via plural kinds of buses to keep independence in the total ACP.

The system controller 31a controls other functional units via the parallel bus Pb. The parallel bus Pb is used to transfer image data. The system controller 31a issues an operation control instruction to the IMAC to store the image data into the MEM and the HDD. This operation control instruction is transmitted via the IMAC, the parallel bus I/F 37a, and the parallel bus Pb.

In response to this operation control instruction, the image data is transmitted from the CDIC to the IMAC via the parallel bus Pb and the parallel bus I/F 37a. The image data is then stored into the MEM or the HDD based on the control of the IMAC.

On the other hand, the system controller 31a of the ACP functions as a printer controller, a network control, and a serial bus control, in the case of a call as the printer function from the PC. In the case of via the network, the IMAC receives print output request data via the network I/F 38a.

In the case of a general-purpose serial bus connection, the IMAC receives print output request data via the serial bus I/F 39a. The general-purpose serial bus I/F 39a corresponds to plural kinds of standards.

The system controller 31a develops the print output request data from the PC into image data in the area within the MEM. Font data necessary for the development can be obtained by referring to the font ROM 36a via a local bus I/F 33a and a local bus Rb. The local bus Rb is used to connect the system controller 31a to a nonvolatile memory 35a and a RAM 34a. The serial bus Sb includes an I/F to be used to transfer data to the operation board 220 as the operating unit of the ACP, in addition to an external serial port 32a to connect to the PC. The serial bus Sb is used to communicate with the system controller 31a via the IMAC to receive a process procedure and display a system state, in addition to the development of print output request data. Data transmission and reception between the system controller 31a and the MEM, the HDD, and various kinds of buses are performed via the IMAC. Jobs that use the MEM and HDD are integrally managed in the total ACP.

The CDIC receives image data output from the color document scanner 210 (the SBU), and outputs the image data to the IPU 2. The IPU 2 executes "scanner image processing" 190, and outputs the processed result to the CDIC. The CDIC executes a primary compression of the image data to increase the transfer efficiency in the parallel bus Pb. The compressed image data is transmitted to the parallel bus Pb. The CDIC expands the primary-compressed image data input from the parallel data bus Pb for the bus transfer. The expanded image data is transferred to the IPU 2. The IPU 2 converts the RGB image data into the YMCK image data based on the "image quality processing", i.e., the image data Yp, Mp, Cp, and Kp to be output by the printer PTR, and outputs the YMCK image data to the color printer PTR.

The CDIC has both conversion functions of parallel data to be transferred through the parallel bus Pb and serial data to be transferred through the serial bus Sb. The system controller 31a transfers data to the parallel bus Pb. The process controller 131 transfers data to the serial bus Sb. The CDIC executes parallel/serial data conversion to communicate with the two controllers 1 and 131.

Figure 5:
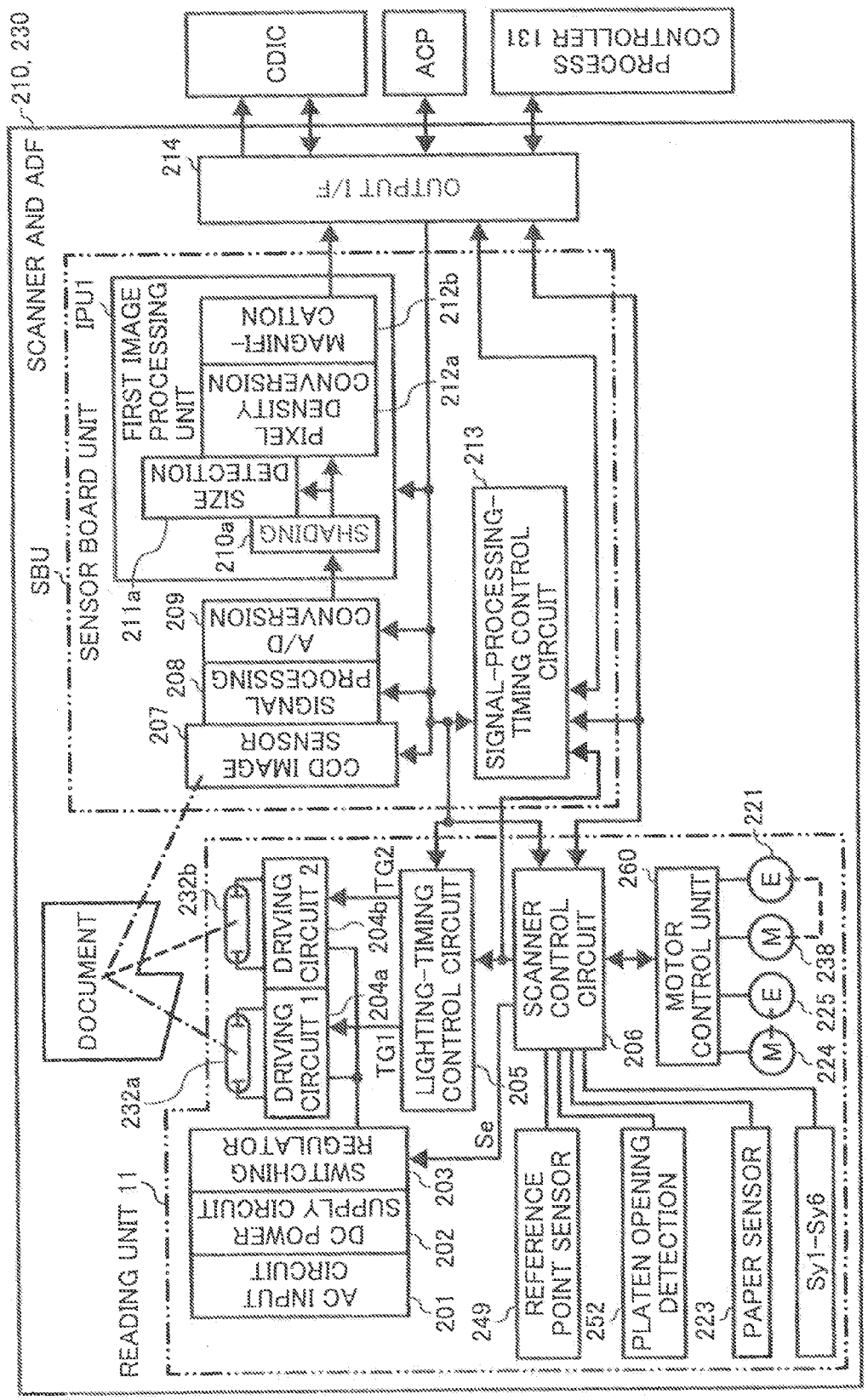
FIG. 5 is a block diagram of an outline of an electric system of a part combining the document scanner and the ADF shown in FIG. 1.

FIG. 5 is a configuration diagram of the electric system of the image reading performed by the color document scanner 210 and the ADF 230. The CCD 207 outputs electric signals of color analog image signals R, G, and B. A signal processor 208 amplifies each color analog image signal. An analog-to-digital (A/D) converter 209 converts the analog signal into a digital image signal, that is, image data. The image data is shading-corrected 210a, document-size detected 211a, pixel-density conversion 212a, and a magnification 212b, and is then output to the IPU 2 via the CDIC. The A/D converter 209 converts the analog image signal into the digital image data.

A scanner control circuit (the reading controller) 206 controls a lighting-timing control circuit 205, a signal-processing-timing control circuit 213, and a motor control unit 260, based on instructions from the system controller 31a and the process controller 131 of the ACP. The lighting-timing control circuit 205 on/off controls the illumination lamps 232 (232a and 232b) according to the instructions from the scanner control circuit 206, and determines brightness (time-series average value or smoothed value) of the illumination lamp 232 at the luminance (light intensity) instructed by the process controller 131 via the signal-processing-timing control circuit 213. The reference numeral 232 collectively covers the reference numerals 232a and 232b. The scanner control circuit 206 also carries out the reading control (RCP) to detect the size of the document mounted on the contact glass 231. This is described later with reference to FIGS. 8 and 9.

The motor control unit 260 controls the sub-scanning driving motor 238 and the ADF motor 224 following the instruction from the scanner control circuit 206. These motors are stepping motors. Rotary encoders (E) 221 and 225 are connected to the axis of the driving system of these motors. An up-down counter within the motor control unit 260 counts and holds the electric pulses generated by the rotary encoders 221 and 225, to obtain the document scanning position (y) and driving amount, and front and back end positions of the document fed by the ADF, and the fed amount.

A paper sensor 223 connected to the scanner control circuit 206 includes a sensor that detects presence of the document on the document tray of the ADF, a sensor that detects a paper jam, and a sensor that detects a document size. The reference sensor 249 detects a passage of the first carriage through the reference position. As shown in FIG. 3, a position returned from the reference position by the component a in the return direction is the home position HP of the first carriage. This is a sheet-through reading position facing a window plate.

The scanner control circuit 206 includes an input and output I/F to which a microcomputer system covering the CPU, the ROM, and the RAM and the sensors are connected, an input and output I/F to which the lighting-timing control circuit 205, the signal-processing-timing control circuit 213, and the motor control unit 260 are connected, and a communication I/F to which the process controller 131 and the system controller 31a are connected. The operation board 220 includes an initialization key. When the operator operates this key, each default menu is displayed on the display of the operation board 220. When the operator assigns the initialization item of the document scanner on the menu, the initialization menu screen of the document scanner is displayed on the display. The operator can adjust and set control data to specify or adjust the reading operation characteristics of the color document scanner 210 and the ADF 230, and various kinds of parameters for adjusting image signal processing characteristics. The control data includes instruction information (FSDc) for selectively assigning an instantaneous instruction to detect a document size and an instruction of a rise detection mode linked with the detection of the rise of the illumination light intensity. When the operator assigns the instantaneous instruction of the detection of the document size, the instruction information is set to "0". When the operator assigns the rise detection mode, the instruction information is set to "1". This instruction information is referred to at step 10a in FIGS. 8 and 18 described later.

Various parameters for adjusting the control data and the image signal processing characteristics destined to the color document scanner 210 and the ADF 230 are stored, together with the control program and the image processing program, into the HDD shown in FIG. 4. Immediately after the operation voltage is applied to the color document scanner 210, the CPU of the scanner control circuit 206 requests the system controller 31a to execute initialization, reads the operation program and the control data from the HDD, and writes the operation program and the control data into the RAM externally attached to the CPU or the RAM inside the CPU. A first image processing unit IPU 1 (hereinafter, "IPU 1") and a CPU shown in FIG. 7 of the sensor board unit SBU read the image signal processing program and various parameters from the HDD, and write them into the control information memory CM shown in FIG. 7, at the time of initialization immediately after the operation voltage is applied to the CPU.

The signal-processing-timing control circuit 213 generates various kinds of signals following the instructions or control signals from the scanner control circuit 206, and the system controller 31a and the process controller 131 of the ACP. In other words, when the image reading is started, the signal-processing-timing control circuit 213 gives control signals including a shift gate signal SH, transfer clocks, a reset signal RS, and a clamp gate signal CLP, to the CCD 207. The signal-processing-timing control circuit 213 outputs a pixel synchronization clock pulse CLK, a line synchronization signal LSYNC, and a main scan valid period signal LGATE, to the system controller 31a. The pixel synchronization clock pulse CLK is approximately the same signal as the shift clock given to the CCD 207. The line synchronization signal LSYNC corresponds to a line synchronization signal MSYNC that is output by a beam sensor of the image creating unit 135 of the printer 14. Outputting the line synchronization signal LSYNC is prohibited when the image reading is not being carried out. The main scan valid period signal LGATE becomes at the high level H at a timing (a document area reading period) when the image signal output from the CCD 207 is regarded as valid.

Upon receiving the reading starting instruction from the system controller 31a of the ACP, the scanner control circuit 206 switches a control signal Se to a switching regulator 203 to a level at which the power supply output on is instructed, and controls the generation of the control signal from the signal-processing-timing control circuit 213, thereby starting the reading by the CCD 207, lighting the illumination lamp 232, and starting the driving of the sub-scanning driving motor 238 (manual feed mode) or the ADF motor (the ADF mode). The scanner control circuit 206 also sets the sub-scan valid period signal FGATE to the high level H (outside the document area). In the manual feed mode (the flatbed reading system), the signal FGATE is switched to a level L indicating the inside of the document area when the first carriage reaches the document starting position. In the ADF mode (the sheet-through reading system), the signal FGATE is switched to a level L indicating the inside of the document area when the document front end feeding amount from the resist roller reaches the document reading position in the ADF mode in which the ADF 13 is used. In the manual feed mode, when the scanning of the document last edge ends, the sub-scan valid period signal FGATE is returned to H indicating the outside the document area. In the ADF mode, when the document last edge passes through the HP, the sub-scan valid period signal FGATE is returned to H indicating the outside the document area.

A commercial alternating current is applied to an alternating current input circuit 201 of the reading unit 11. A direct current power supply circuit 202 coverts the commercial alternating current into a direct current. A switching regulator 203 converts a direct current voltage into a boosted direct current, controls the voltage at a constant level, and applies the voltage as a discharging lamp power supply to driving circuits 204a and 204b including inverters. The inverters of the driving circuits 204a and 204b convert a high-voltage direct current into a high-voltage alternating current and apply this alternating current to the illumination lamps 232a and 232b during the period of the low level L of the lighting instruction, in response to lighting control signals TG1 and TG2 given by the lighting-timing control circuit 205. The illumination lamps 232a and 232b are discharging lamps, and are driven by the high-voltage alternating current, thereby emitting light and illuminating the document. The high level H of the lighting control signals TG1 and TG2 is a light-off instruction. When the lighting control signals TG1 and TG2 are switched to the high level H, the inverters of the driving circuits 204a and 204b stop converting the high-voltage direct current into the high-voltage alternating current. In other words, the inverters of the driving circuits 204a and 204b stop outputting the high-voltage alternating current to the illumination lamps, thereby turning off the illumination lamps 232a and 232b.

The sensor board unit SBU has the first image processing unit IPU 1.

Figure 6A:
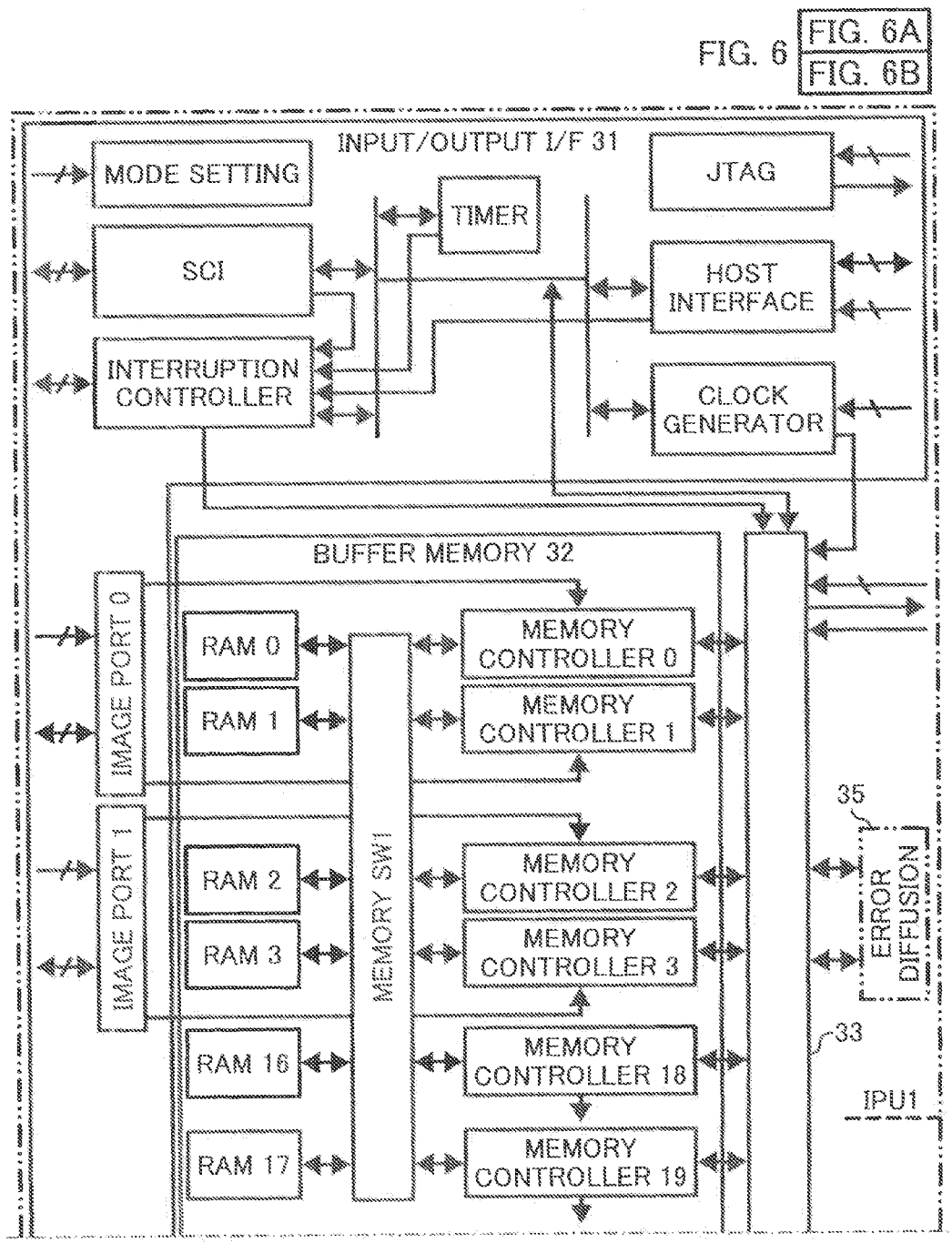
FIG. 6 is a block diagram of an outline of a hardware configuration of a size detector (an instruction processing unit (IPU)) shown in FIG. 5.
Figure 6B:
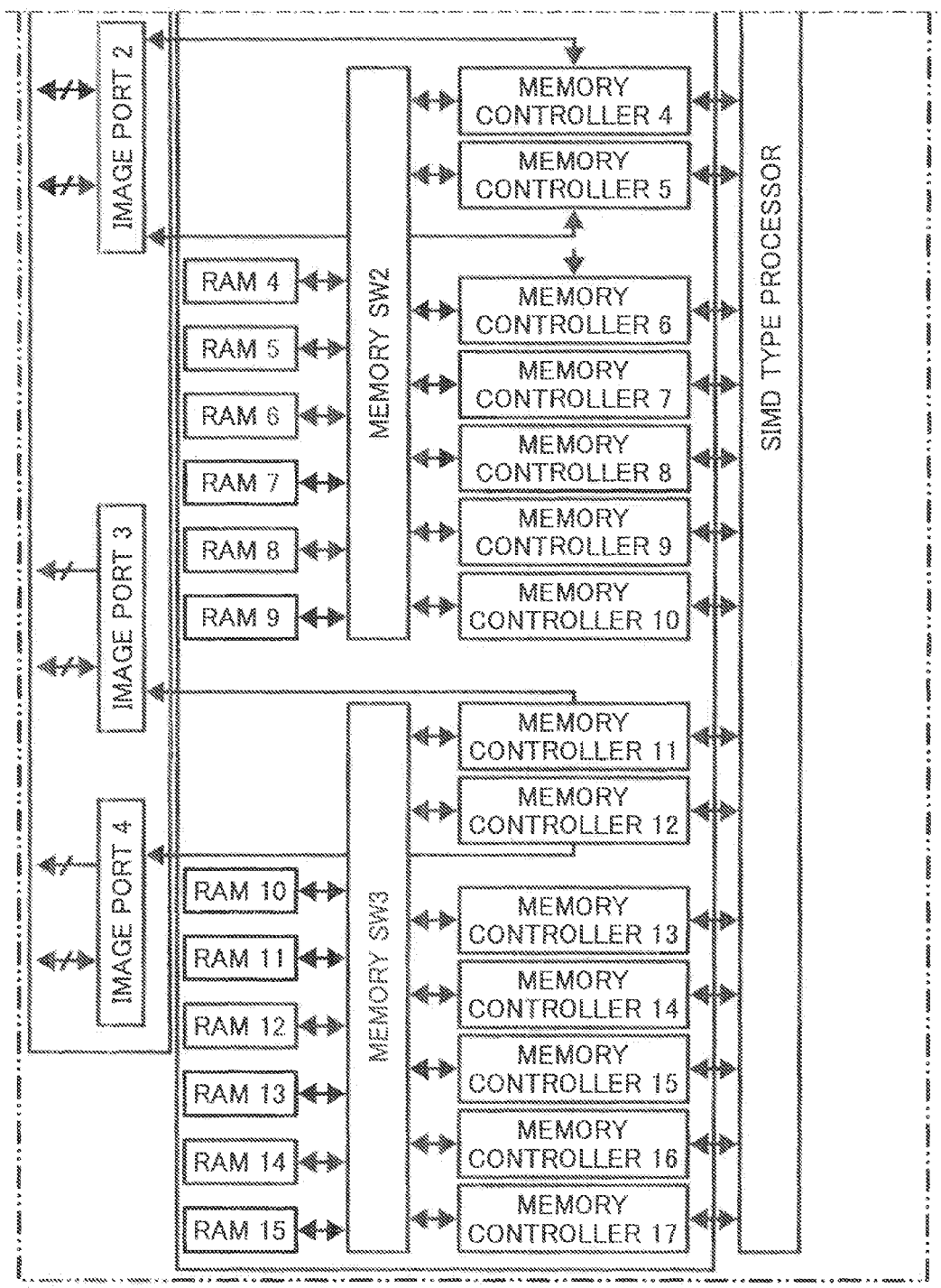

FIG. 6 is a configuration diagram of the IPU 1. The input and output I/F 31 includes image ports 0 to 4 that input and output image data, a motor setter (a mode assigning decoder) that exchanges control data, a control signal, and a synchronization signal, a system control I/F (SCI), an interruption controller, a circuit automatic test (based on Joint Test Action Group (JTAG)), a host I/F, a clock generator, and a timer. The image ports 0 and 1 are exclusively used for the input of image data. The image port 2 is exclusively used for the input and output of image data. The image ports 3 and 4 are exclusively used for the output.

The image ports 0 to 4 include a first port and a second port. One-byte data can be input or output simultaneously at each of the first and the second ports. With this arrangement, two-byte data can be input or output in parallel at the image ports 0 to 4. The RGB color image data (a multi-valued tone) has eight bits. The reading output data (a multi-valued tone) when the monochromatic reading (the monochromatic processing mode) is assigned also has eight bits. Therefore, in the monochromatic processing mode, two image data, that is, two-pixel image data, can be input and output simultaneously in parallel. In the color processing mode, two RGB image data of one pixel can be input and output simultaneously in parallel.

Each of RAMs 0 to 15 of buffer memories 32 has an 8-kilobyte memory capacity. The 8 kilobytes are the capacities capable of storing the multi-valued image data of 600 dots per inch (dpi) in one line parallel with a short side of A3 paper (eight bits: a kind of RGB image data). The 8-kilobyte data is used to input or output image data as a line buffer, or as a LUT. There are 16 kinds of RAMs, and each can select a batch reading and writing of two bytes, and a reading and writing of one byte. Each of two RAMs 16 and 17 has 2-kilobyte capacity. These RAMs are used as circulation shift registers that shift image data in circulation to absorb a speed difference of a serial data transfer between the image data transfer origin and the image data transfer destination.

These RAMs 0 to 17 are connected to any one of the memory switches SW1 to SW3. Memory controllers 0 to 17 are present between image ports 0 to 4, the memory switches SW1 to SW3, and an SIMD type processor 33. The memory controllers 0 to 5, 11, and 12 connected to the image ports 0 to 4 have a data input and output function of inputting and outputting data at image ports according to the input and output node assignment given by the SIMD type processor 33. The image port, the SIMD type processor 33, or the RAMs 0 to 17 become at the data transmission side of data transfer to these memory controllers or the data reception side of the data transfer.

Other memory controllers 6 to 10 and 13 to 19 also have a data selection function of determining a data transfer direction (from and to) according to the input and output mode assignment given by the SIMD type processor 33. The SIMD type processor 33 or the RAMs 0 to 17 become at the data transmission side of data transfer to the memory controllers or the data reception side of the data transfer. However, there is no connection function of connecting to the image port. The memory controllers 0 to 19 set the memory switches SW1 to SW3 to the assigned RAMs 0 to 17 according to the RAM assignment given by the SIMD type processor 33.

Each of the memory controllers 0 to 19 includes a setting information register that stores memory controller setting information given by the SIMD type processor 33, a management information register that stores management information of connection destinations RAMs 0 to 17 assigned by the SIMD type processor 33, and a direct memory access (DMA) controller DMAC. The DMAC includes an address counter that determines a reading and writing address of the connection destination RAMs 0 to 17, a starting address register (latch), an ending address register, a use-mode register, and a memory input and output control circuit. Each of the starting address register, the ending address register, and the use-mode register can store plural pieces of information so as to be able hold a starting address and an ending address of each area in plural areas of the RAM, and a use-mode (a buffer memory and a local user terminal (LUT)). The memory input and output control circuit includes a decoder that decodes data of the setting information register and the management information register, and generates a control signal and a timing signal to the receiving side in synchronism with the timing signal at the transmission side of data transfer. Each of the 8-kilobyte RAMs 0 to 15 includes a half-frequency divider that halves a pixel synchronization pulse, to generate an even number (or, an odd number) pixel synchronization signal to be used in each data processing to divide one-line data into odd pixel data and even pixel data and to integrate an odd pixel data and an even pixel data into one line data.

In reading and writing data from and to the buffer memories 0 to 17, the decoder of the memory input and output control circuit compares the count values (the pixel addresses) of the image synchronization pulse of the address counter with the data of the starting address register and the end address register, thereby detecting the current RAM access area. The decoder reads the data of the used mode in the detected area from the use-mode register, decodes the data into the operation mode control signal, and controls the reading and writing in the RAMs 0 to 17.

When a RAMa is selected from the RAMs 0 to 17 to be connected to one memory controller A out of the memory controllers 0 to 19 based on the memory control setting information, and when a "buffer memory" (writing and reading) is assigned to the used mode, the memory controller A determines a data selector inside the memory switches SW1 to SW3 to be used for the memory controller A to access the RAMa. In this case, when the memory controller setting information assigns the reading of the input color image data, color image data that enters the assigned image port is written into the RAMa (one of RAMs 0 to 17) assigned by the SIMD type processor 33.

Figure 7:
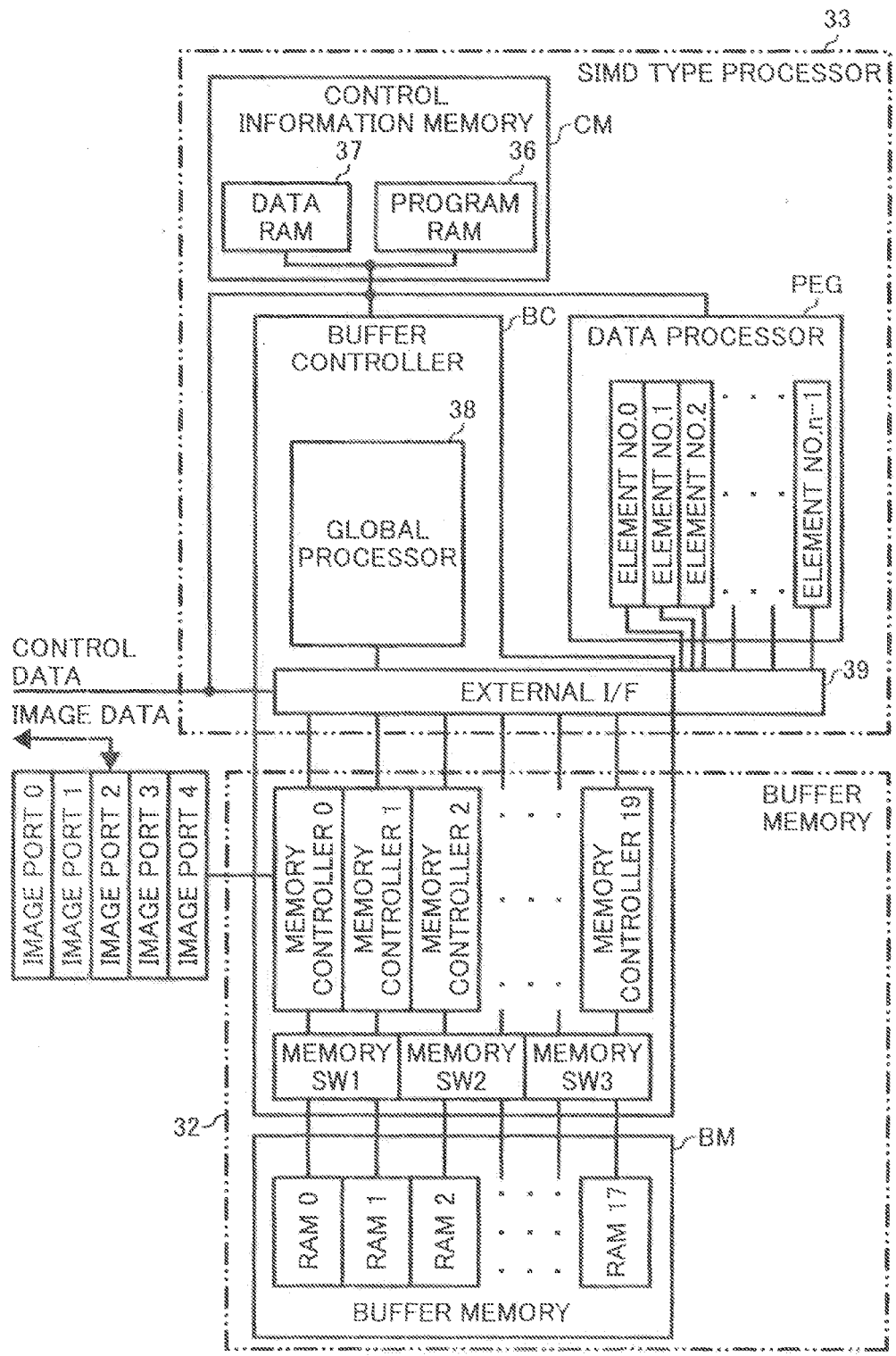
FIG. 7 is a block diagram of an outline of a hardware configuration of a single instruction stream multiple data stream (SIMD) type processor shown in FIG. 6.

FIG. 7 is an outline diagram of the configuration of the SIMD type processor 33 shown in FIG. 6. The SIMD type processor 33 as the data processor has local memory RAMs of a processor element PE section inside the processor. The SIMD type processor 33 controls a memory area and a data path to be used, based on the data bus control within a global processor 38. The local memory RAMs are allocated as buffer memories to the input data and output data. The stored data are output to the outside from an external I/F 39. The global processor 38 simultaneously gives the same operation instruction to the processor element PEs, that is, the data processors PEG, that execute the same image processing simultaneously to multi-valued image data equal to or above eight bits, including the local memory RAMs. The operation results of the processor element PE are stored into the local memory RAMs again, and are output to the memory controller through the external I/F 39.

A program RAM 36 and a data RAM 37 exchange process procedures performed by the processor element PE and parameters used for the process. Programs and data of the hard disk HDD are downloaded to the program RAM 36 and the data RAM 37 via an IMAC/parallel bus Pb/CDIC/serial bus Pb, based on the instruction from the system controller 31*a*. The direct memory access controller (DMAC) at the external I/F 39 executes this data transfer in response to a load command given by the system controller 31*a*. The process controller 131 sets this data flow according to the request of the DMAC.

The RAMs 0 to 17 are buffer memories BMs, and these include a buffer controller BC that reads and writes data from and to these RAMs, memory switches SW1 to SW3, the memory controllers 0 to 19, the external I/F 39, and the global processor 38. The buffer controller BC controls data transfer between the data processors PEG including the image ports 0 to 4, the buffer memory BM, and the processor elements PEs. The global processor 38 determines a data transfer mode between the data processors, and determines the contents of the data processor PEG, based on the data program of the program RAM 36.

The data program of the program RAM 36 includes transfer mode data for determining a data transfer mode, and processing mode data destined to the data processor PEG. At the control stage (timing) of recognizing (reading) transfer mode data, the global processor 38 decodes the transfer mode data, reads lower control data (memory controller-assigned data) for controlling data selectors Ds 29 and Ds 21 of the external I/F 39, and lower-hierarchy control information data (setting information and management information) to be given to the memory controllers assigned by the lower control data, corresponding to the transfer mode data, from the data RAM 37, and gives the read data to the external I/F 39 or to the memory controllers via the external I/F 39.

At the control stage of recognizing the processing mode data, the global processor 38 decodes the data processing mode, reads the data processing program, reference data, and setting data of the data processor PEG destined to the data processing mode, from the data RAM 37, and writes the read data into the internal RAM of each processor element PE of the data processor PEG. The control information memory CM configured by the program RAM 36 and the data RAM 37 stores the control information data of the buffer memory BM (the RAMs 0 to 17), and conversion data including a conversion table or operation data.

The buffer memory BM stores data that are sequentially input, outputs a predetermined number of the stored data to the data processor PEG at the same time, temporarily stores the predetermined number of data processed by the data processor PEG, and outputs the data. The data processor PEG as the processor elements PEs simultaneously inputs and processes the predetermined number of data of the buffer memory BM, and simultaneously outputs the processed predetermined number of data. The buffer controller BC suitably changes the connection of both such that the data processor (PEG) is suitable for the parallel input and output, and forms the same plurality of conversion table in the buffer memory BM based on the conversion data of the control information memory CM.

The buffer controller sets a part or whole of the buffer memory BM (the RAMs 0 to 17) in a state suitable for the parallel input and output of the data processor PEG. Thereafter, the buffer controller simultaneously inputs the predetermined number of data from the buffer memory BM into the data processor PEG, or simultaneously outputs the predetermined number of data processed by the data processor PEG to the buffer memory BM, or simultaneously outputs serial data converted from the data in each conversion table, by relating each series of converted data to plural conversion tables formed in the buffer memory BM, or carries out both processes.

At the time of changing the contents of the image processing or at the time of changing the processing mode (combination of image processing) required by the system, selection by the system controller 31*a* of a data set to be transferred from the HDD to the program RAM 36 and the data RAM 37 is executed by changing the contents based on instructions from an operation board OPB or the personal computer PC. A data set to be transferred from the HDD to the program RAM 36 and the data RAM 37 is also selected by rewriting the contents.

RAMs within the elements PEs of the data processor PEG shown in FIG. 7 are connected to the input and output buses within the external I/F 39. The global processor 38 sets the DNA transfer of reading/writing of the RAMs within the element PEs to the memory controllers. With this arrangement, the global processor 38 can write data to the RAMs within the individual elements PEs from the outside of the SIMD type processor 33, or can read data from the RAMs within the individual elements PEs to the outside of the SIMD type processor 33. In other words, data can be transferred between the image ports 0 to 4, the RAMs 0 to 17, and the processor elements PEs (PEG) of the SIMD type processor 33, shown in FIG. 6. One data line between the RAMs 0 to 17 and the SIMD type processor 33 is a set of bus through which eight-bit data can be transferred in bit parallel.

When the used mode of the RAMs is the generation of the LUT (the conversion table), and also when the memory controller setting information is the generation of the shading LUN (the writing of the LUT data into the RAMs), a memory controller B as one of the memory controllers 0 to 19 writes shading correction data given by the SIMD type processor 33 into the starting address to the ending address, assigned by the SIMD type processor 33, of the RAM b (one of the RAMs 0 to 15) assigned by the SIMD type processor 33.

When the mode assigned by the memory controller setting information is the transmission of color image data, the color image data output by the SIMD type processor 33 or the color image data of a RAMe (one of the RAMs 0 to 15) assigned by the SIMD type processor 33 is transmitted to the image port. The assignment mode includes a shading correction 210, the document size detection 211*a*, the pixel density conversion 212*a*, the magnification 212*b*, or the like. The assignment mode also includes a parallel/serial conversion, and a serial/parallel conversion, of writing color image data to the RAMs 0 to 17 and reading color image data from the RAMs 0 to 17. All processing programs and data are stored in the HDD. The global processor 38 of the IPU 1 reads data from the HDD via the system controller 31*a* and the IMAC and stores the data into the control information memory CM, in the initialization carried out when the power supply to the color document scanner 210 is turned on and when the operation voltage is applied to the global processor 38.

The scanner control circuit 206 includes a microcomputer having a CPU, a ROM, and a RAM. The microcomputer executes main controls. When power is supplied to the color document scanner 210 and when the operation voltage is applied to the scanner control circuit 206, the CPU of the scanner control circuit 206 initializes the color document scanner 210 and the ADF 230. After the above operation and after the IPU 1 executes the above initialization, the scanner control circuit 206 forms the shading correction LUT in a part of the RAMs 0 to 17 of the buffer memory 32 of the IPU 1. In other words, when the illumination lamp 232 is turned on and when the bright is adjusted to a predetermined level, the scanner control circuit 206 drives the first carriage (lamp 232 and the first mirror 233) to the position of the reference white plate 239, and instructs the global processor 38 of the IPU 1 to generate the shading correction LUT via the signal-processing-timing control circuit 213. In response to this, the IPU 1 reads a few lines of the image data obtained when the A/D converter 209 converts the line-reading image signal of the CCD 207 into digital data. The IPU 1 calculates an average value of image data at the same main scanning x direction, and calculates each gain necessary to set the image data (average value) at each pixel position (x position) on the main scanning one line, to a setting level. The IPU 1 writes each gain to the destination of each pixel position (x position), in the shading correction LUT determined in a part of the RAMs 0 to 17 of the buffer memory 32 of the IPU 1. After ending the reading of the reference white plate 239, the scanner control circuit 206 turns off the illumination lamp 232, and returns the first carriage to the home position HP.

Figure 8A:
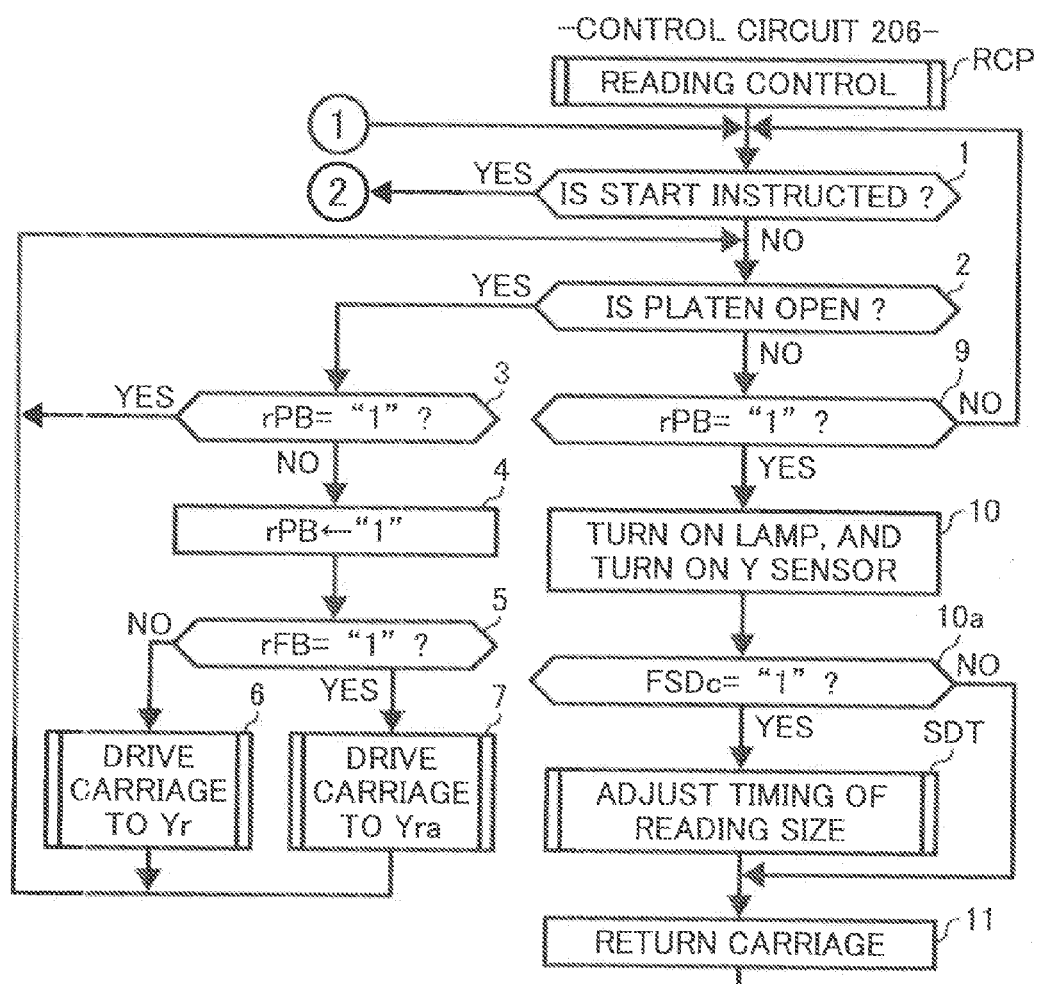
FIG. 8 is a flowchart of a part of an outline of the contents of "reading control" (RCP) of a scanner control circuit shown in FIG. 5.
Figure 8B:
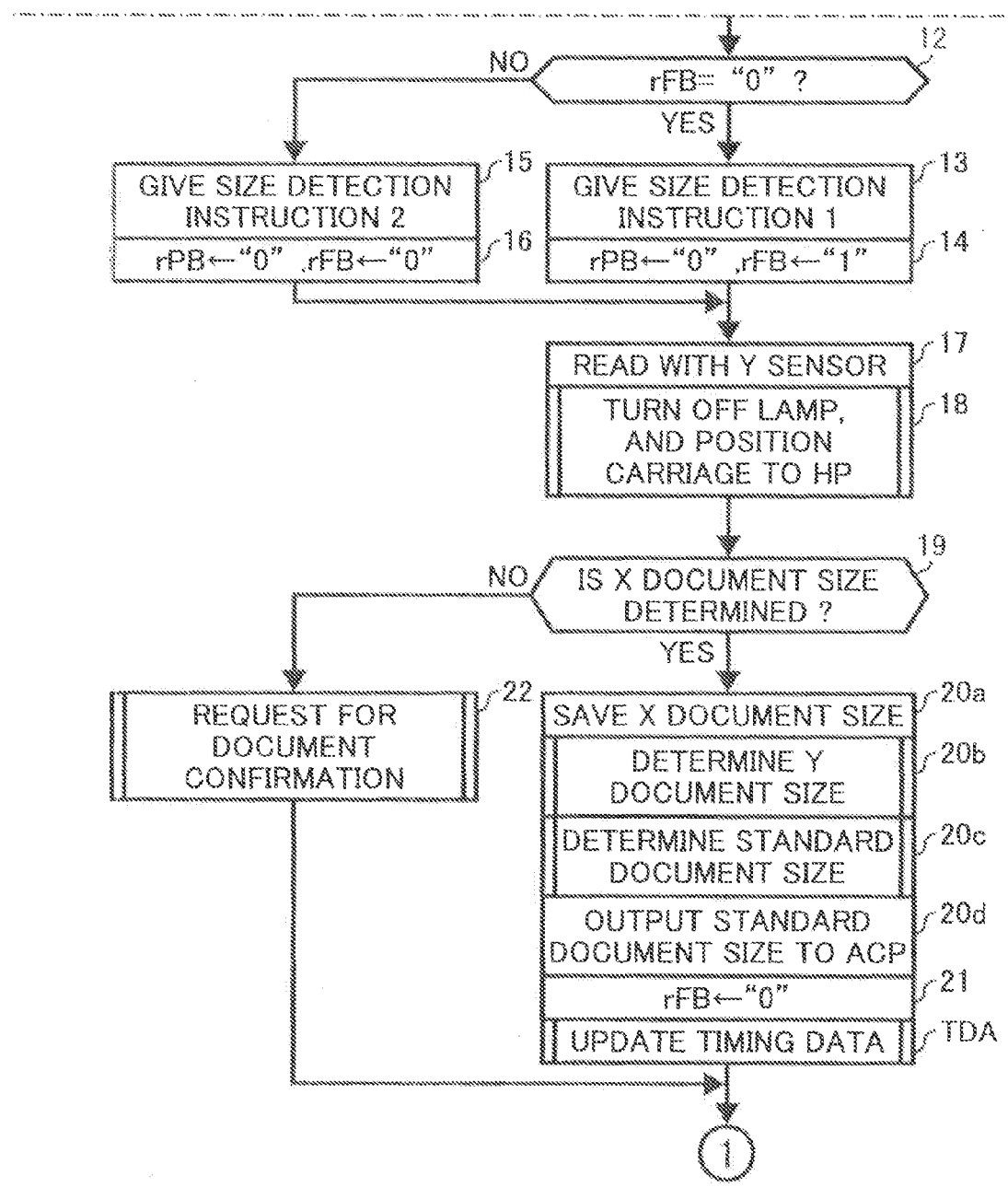

FIGS. 8 and 9 depict the outline of the document reading control (RCP) performed by the scanner control circuit 206. With reference to FIG. 8, when the user erects the ADF 230 to lift the platen 250p from the contact glass 231, and when the platen forms an angle (opening) of about 20 degrees with the contact glass 231, the detection signal of the platen-opening detecting switch 252 is switched from L (closed) to H (open). In response to this, the scanner control circuit 206 writes "1" that indicates the opening of the platen into a register rPB (one area of the RAMs within the CPU inside the scanner control circuit 206) (4), and drives forward the first carriage, mounted with the illumination lamp 232 and the first mirror 233, to a first setting position Yr in the sub-scanning direction y (steps 1 to 6; a second carriage is linked to this. However, the speed is a half of that of the first carriage. This similarly applies to the following explanation). At step 5, it is checked whether data of a register rFG is "1" that shows that a first reading of the document is over (the detection of the first reading of the document is unsuccessful). The data of the register fFB is operated (changed) at steps 14, 16, and 21 later.

In the following explanation, the word "step" is omitted, and only step numbers are shown in brackets.

The register rPB holds a detection signal ("1": open, and "0": closed) of the platen-opening detecting switch 252. The scanner control circuit 206 writes the detection signal into the register rPB at each time of reading the detection signal. After reading the detection signal, when the level ("1"/"0") is different from that of the data of the register rPB, it is clear that the platen is changed from "closed" to "open" or from "open" to "closed", immediately before reading the detection signal. In other words, when the data of the register rPB is "0" and when the detection signal of the platen-opening detecting switch 252 is "1", it is clear that the platen 250p is changed from "closed" to "open", or the platen is opened. When the data of the register rPB is "1" and when the detection signal of the platen-opening detecting switch 252 is "0", it is clear that the platen 250p is changed from "open" to "closed", or the platen is closed. The route of steps 2-3-4-5 is that for detecting that the platen 250p is changed from "closed" to "open". The route of steps 2-9-10 is that for detecting that the platen 250p is changed from "open" to "closed".

As described above, when the first carriage is driven forward to the first setting position Yr in the sub-scanning direction y in response to the change of the platen 250p from "closed" to "open", the reading position of the contact glass of the first mirror 233 is the position shown by a thick dashed line in FIG. 13. In the present embodiment, this position is at the front end side (at the origin O side in the sub-scanning direction) from the back edge part in the longitudinal direction of "name card" as a minimum size of the standard document size to be detected. This position does not interrupt or cross the reflection type optical sensors Sy1 to Sy6 that detect the document size in the sub-scanning direction y. Positions to be extracted to detect the document size in the main scanning direction x of the image data by the line reading by the CCD 207 are two groups of the areas B11 to B51 and B12 to B52 shown in FIG. 13. The positions in the main scanning direction x of the second group parts B12 to B52 are the same as the positions in the main scanning direction x of the first group parts B12 to B52. These positions correspond to the back edge in the main scanning direction x of the standard sizes (name card, postcard, B5 horizontal, B4 horizontal, and A3 horizontal (A4 vertical)).

Referring back to FIG. 8, when the first carriage is positioned at the first setting position Yr, the scanner control circuit 206 waits for the change of the detection signal of the platen-opening detecting switch 252 from H ("open") to L ("closed") (1, 2-9-1, 2-9). When the detection signal is changed, the scanner control circuit 206 turns on the laser diode of the illumination lamp 232 and the reflection type optical sensors Sy1 to Sy6 (hereinafter, simply "Y sensor") (10). The scanner control circuit 206 refers to the assigned information FSDc of the register FSDc determined in one area within or outside the CPU of the scanner control circuit 206 (10a). When the assignment information FSDc is "0" for assigning an "instantaneous instruction of document size detection", the first carriage is returned immediately (11), and a "size detection instruction 1" is given to the IPU 1 via the signal-processing-timing control circuit 213 (12, 13). However, when the assigned information FSDc is "1" for instructing a "rise detection mode", a "size reading timing adjustment" (SDT) is executed first, and then the first carriage is returned (11), and the "size detection instruction 1" is given to the IPU 1 via the signal-processing-timing control circuit 213 (12, 13). The content of the "size reading timing adjustment" (SDT) is described later with reference to FIG. 10.

When the "size detection instruction 1" is given to the IPU 1 (12, 13), the CPU of the scanner control circuit 206 writes "1", that expresses that the first reading of the document size is over, into the register rFG (14). In response to the "size detection instruction 1", the IPU 1 reads the image signal of the line reading that is repeatedly generated by the CCD 207 and detects the X document size. This content is described later with reference to FIG. 12.

The scanner control circuit 206 then writes "0", which expresses that the platen is closed, into the register rPB, and writes "1", that expresses that the first detection of the document size is over, into the register rFB (14). The scanner control circuit 206 reads a detection signal of the Y sensor (Sy1 to Sy6) (17). When the reading field of view of the first carriage is deviated from the starting point (the origin O in FIG. 13) of the contact glass 231, the illumination lamp 232 is turned off, and the first carriage is stopped at the home position HP (18).

When the IPU 1 notifies the end of the X document size (X document size data ready), the scanner control circuit 206 receives the X document size data, and stores the data into the register (20a). The scanner control circuit 206 generates Y document size data by determining a Y document size based on the detection signal of the Y sensors (Sy1 to Sy6) read at step 17 (20b). The scanner control circuit 206 determines the total size of the document surface as one of the standard document sizes, based on the X document size data and the Y document size data (20c), and outputs the determined standard document size to the system controller 31a of the ACP (20d). The ACP determines the area of the document image data processing to be executed, as the standard document size. In the case of the copy mode, a required paper size is determined based on the standard document size and the assigned copy magnification, and the paper of this size is set to the paper feeder for printing.

As described above, when the X document size data is obtained, "1" that expresses the end of the first detection of the document size is erased from the register rFB (21). In other words, "0" is written into the register rFB. With this arrangement, the first carriage is driven to the first setting position Yr when the platen 250$p$ is opened next (5-6). A "timing data updating" (TDA) is carried out next. This content is described later with reference to FIG. 10.

When the IPU 1 notifies a failure of the detection of the X document size, the scanner control circuit 206 instructs the display of the document confirmation request to the operation board via the system controller 31$a$ of the ACP (22). The operation board 220 displays "Please open platen and mount document" allocated to the document confirmation request, on the display panel of the operation board 220. A buzzer provided on the operation board 220 intermittently sounds beep three times. The scanner control circuit 206 returns to the reading of the operation of the platen 250 (1-2-3-2). In this case, the data of the register rFB is "1".

Figure 14:
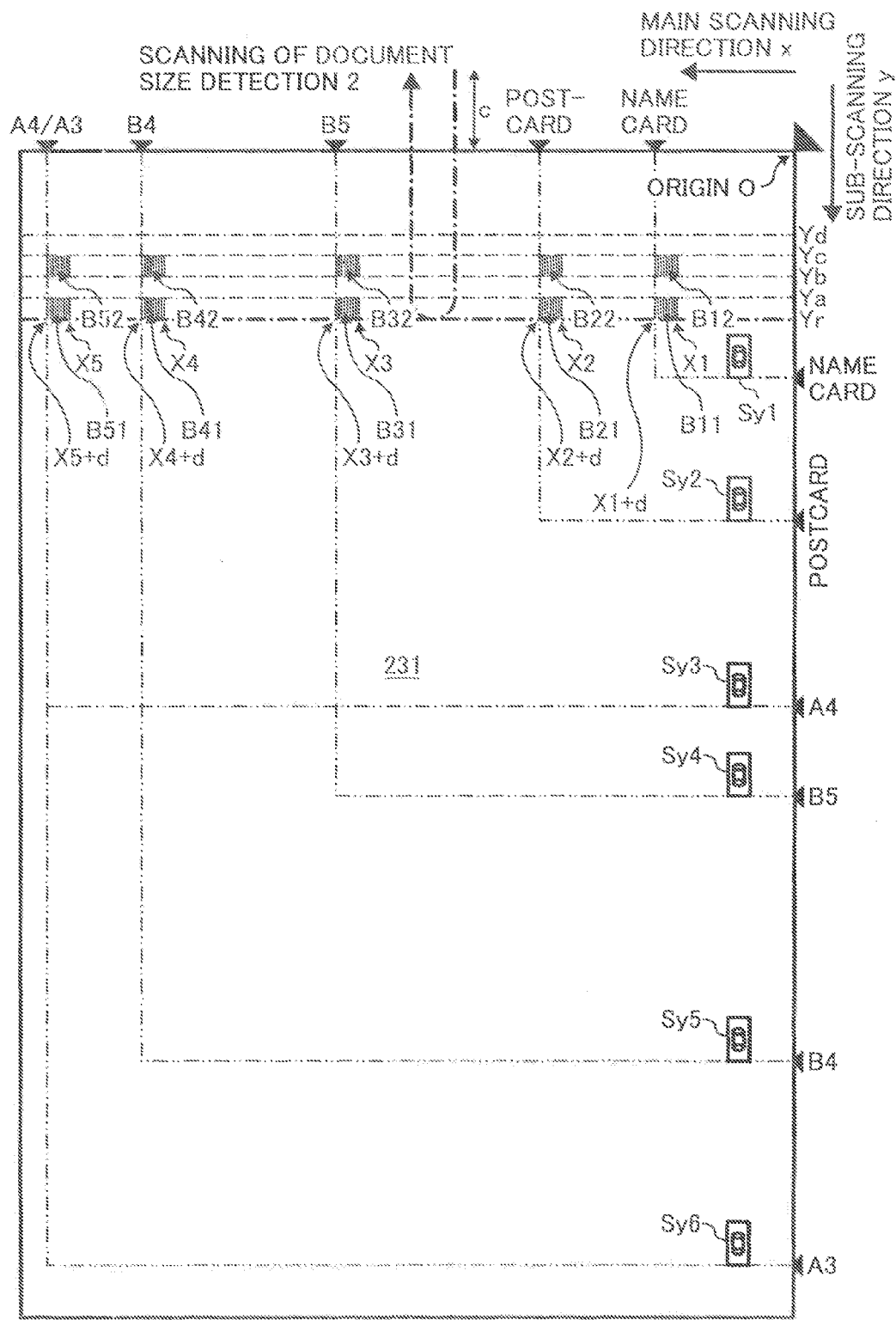
FIG. 14 is an enlarged top plan view of the contact glass shown in FIG. 3, covering the parts at which image data is extracted in a second detection of a document size.

When the platen 250$p$ is opened, the scanner control circuit 206 drives forward the first carriage to a second setting direction Yra in the sub-scanning direction y (step 1 to 5-7). When the first carriage is driven forward to a second setting position Yra in the sub-scanning direction y, the reading position of the contact glass of the first mirror 233 is the position shown by a thick dashed line in FIG. 14. This position is located in a further forward direction from the first setting position Yr (at a position further inside the minimum size (name card) area). Positions to be extracted to detect the document size in the main scanning direction x of the image data by the line reading by the CCD 207 are the two groups of the areas B11 to B51 and B12 to B52 shown in FIG. 14. The positions in the main scanning direction x of the second group parts B12 to B52 are the same as the positions in the main scanning direction x of the first group parts B12 to B52. These positions correspond to the back edge in the main scanning direction of the standard sizes (name card, postcard, B5 horizontal, B4 horizontal, and A3 horizontal (A4 vertical)). However, the second reading positions B11 to B51 and B12 to B52 to detect the X document size shown in FIG. 14 are different from the first reading positions B11 to B51 and B12 to B52 to detect the X document size shown in FIG. 13, relative to the contact glass surface and relative to the return scan starting setting position (Yra).

The illumination lamp 232 is turned on at the setting position (Yr, Yra) in the sub-scanning direction, and the first carriage is returned at the same time. Until when the first carriage is returned to the HP, the image data, having the field of view of the first mirror 233 on the first carriage within the area of the parts B11 to B51 and B12 to B52, is taken into the IPU 1, to determine the X document size. Therefore, depending on the combination of the speed of increasing the light intensity of the illumination lamp 232, the closing speed of the platen, and the distribution of the density of the image on the document, the image reading conditions can be poor at the parts B11 to B51 and B12 to B52. Consequently, the two types of setting positions Yr and Yra shown in FIGS. 13 and 14, and the reading parts are set as described above. When the first detection of the X document size shown in FIG. 13 is unsuccessful, the second detection of the X document size shown in FIG. 14 at different setting positions and different reading parts is executed.

When the planet 250$p$ is closed after the first carriage is driven to the second setting position Yra in the sub-scanning direction y, the scanner control circuit 206 turns on the laser diode of the illumination lamp 232 and the Y sensor (10), returns the first carriage (11), and gives a "size detection instruction 2" to the IPU 1 via the signal-processing-timing control circuit 213 (12, 15). The scanner control circuit 206 writes "0", that expresses that the platen is closed, into the register rPB, erases "1", which expresses that the first detection of the document size is over, from the register rFB (16). The scanner control circuit 206 reads the detection signal of the Y sensor (Sy1 to Sy6) (17). When the reading field of view of the first carriage is deviated from the starting point (the origin O in FIG. 14) of the contact glass 231, the illumination lamp 232 is turned off, and the first carriage is stopped at the home position HP (18). The subsequent process performed by the scanner control circuit 206 is similar to that of the first determination process of the X document size (19 to 22).

With reference to FIG. 9, when the start instruction of the document image reading arrives from the ACP, the scanner control circuit 206 refers to the reading mode data attached to the start instruction (24). When a flatbed reading mode is assigned, the scanner control circuit 206 executes the flatbed reading at steps 25 to 33. In other words, when a standard document size is determined and held, the scanner control circuit 206 turns on the illumination lamp 232, and starts the forward driving of the first carriage (25, 27). When the first carriage enters the reading area of the reference white plate 239, the scanner control circuit 206 outputs the white reference plate reading timing signal to the IPU 1 via the signal-processing-timing control circuit 213 (28). When the first carriage reaches origin O of the document reading, the scanner control circuit 206 outputs the document starting point timing signal and the document size data to the IPU 1 (29). When the sub-scanning position of the first carriage passes the last point of the standard document size, the scanner control circuit 206 stops the forward driving of the first carriage (31), thereby turning off the lamp (32). The scanner control circuit 206 obtains clock data (the current time) of a clock IC located inside the system controller 31$a$ from the system controller 31$a$, and writes the clock data into a turn-off switching time register (Sta) determined in one of the RAMs inside the CPU. The scanner control circuit 206 returns the first carriage to the home position HP (33).

When the scanner control circuit 206 does not have a standard document size, and also when a standard document size is not included in the reading mode data attached to the start instruction, the scanner control circuit 206 requests the ACP for a document size. In response to this request, the ACP displays "Please input reading size" on the operation board 220. When a size is input, this data is transmitted to the scanner control circuit 206. Upon receiving the size data, the scanner control circuit 206 turns on the illumination lamp 232, and starts the forward driving of the first carriage (25, 27).

When the reading document data assigns the ADF reading mode, the scanner control circuit 206 refers to a detection signal of the paper sensor 223 of the document tray 241. When the detection signal shows presence of paper, the scanner control circuit 206 turns on the illumination lamp 232, starts feeding the document by the ADF 230, and reads the document fed by the ADF (35, 36). When the detection signal of the paper sensor 223 shows absence of paper, the scanner control circuit 206 requests the ACP to set (mount) the document (37). In response to this request, the ACP displays "Please set document on document tray" on the operation board 220. When the reading mode data shows no assignment of data, the scanner control circuit 206 refers to the detection signal of the paper sensor 223 of the document tray 241. When the detection signal shows presence of paper, the scanner control circuit 206 reads the document fed by the ADF (38, 36). When the detection signal of the paper sensor 223 shows absence of paper, the scanner control circuit 206 executes the flatbed reading (25 to 33) (38-25).

Figure 10A:
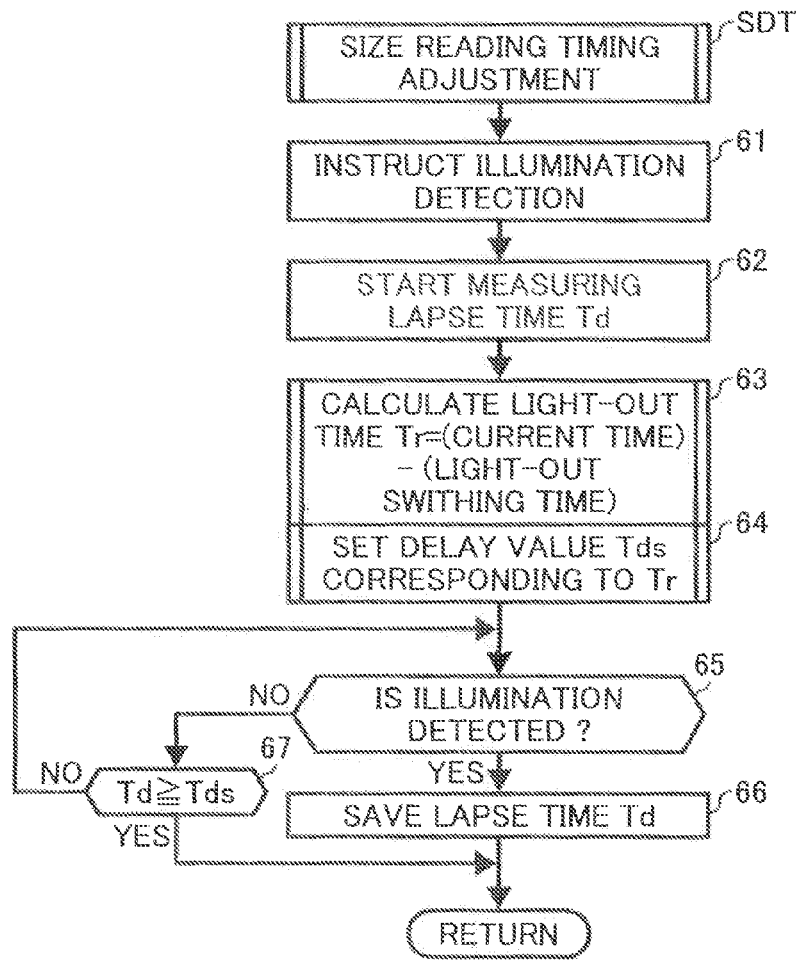
FIG. 10A is a flowchart of the contents of "size detection timing adjustment" (SDT) shown in FIG. 8.
Figure 10B:
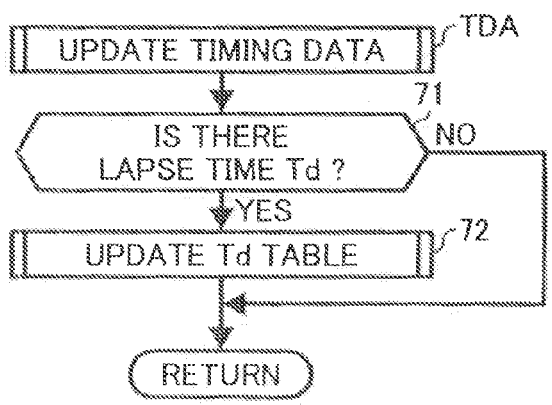
FIG. 10B is a flowchart of the contents of "timing data updating" (TDA) shown in FIG. 8.

FIG. 10 depicts the content of the "size reading timing adjustment" (SDT) shown in FIG. 8. First, the scanner control circuit 206 gives the instruction of "illumination detection" to the IPU 1 (61). In response to this instruction, the IPU 1 starts the "illumination detection" of detecting whether the illumination light intensity of the illumination lamp 232 increases to the luminance suitable for detecting the document size. When the IPU 1 determines that the illumination intensity increases to a suitable value, the IPU 1 notifies "illumination detected" to the CPU of the scanner control circuit 206 (steps 71 to 79 in FIG. 11). The content of the "illumination detection" of the IPU 1 is described later with reference to FIG. 11.

When the instruction of "illumination detection" is given to the IPU 1 (61), the scanner control circuit 206 starts measuring a elapsed-time Td since the lamp lighting is started (62), obtains the current time from the system controller 31a, and calculates the light-off time until the starting of the lamp lighting this time by Tr=(Current time)−(light-off switching time) (63). The light-off switching time is the time data held in the light-off switching register at step Sta in FIG. 9. A delay Tds corresponding to the light-off time Tr is read from a Td table allocated to the RAM inside the scanner control circuit 206, and a threshold value is determined (64). As shown in the following table 1, the Td table includes light-off time Tr divided into eight sections, each section having a number. The elapsed-time Td measured at the light-off time of the section is written in this table.

TABLE 1

Td table

| Section No. | Light-off time Tr | Elapsed-time Td |
| --- | --- | --- |
| 1 | Less than 4 seconds | |
| 2 | Equal to or more than 4 seconds and less than 8 seconds | |
| 3 | Equal to or more than 8 seconds and less than 16 seconds | |
| 4 | Equal to or more than 16 seconds and less than 32 seconds | |
| 5 | Equal to or more than 32 seconds and less than 64 seconds | |
| 6 | Equal to or more than 64 seconds and less than 128 seconds | |
| 7 | Equal to or more than 128 seconds and less than 256 seconds | |
| 8 | Equal to or more than 256 seconds | |

When the IPU 1 notifies the "illumination detected", the scanner control circuit 206 stores the measured elapsed-time Td into the register (66), and the process proceeds to "carriage return" (11). When there is no notification of "illumination detected" from the IPU 1 and when the elapsed-time Td reaches the threshold value Tds, the process proceeds to "carriage return" (11).

In the "timing data updating" (TDA) shown in FIG. 10 (b), when the elapsed-time Td stored at step 66 is present in the register, the scanner control circuit 206 updates the elapsed-time data of the section number corresponding to the light-off time held in the Td table, to the elapsed time Td (71, 72).

In the initialization immediately after the operation voltage is applied to the scanner control circuit 206, a default value (a standard value: for example, a value corresponding to 100 ms) in the control data in the HDD is written into the total section Nos. in the Td table. When the elapsed-time Td is obtained thereafter, the data of the section in the Td table is updated to the obtained elapsed-time.

Figure 11:
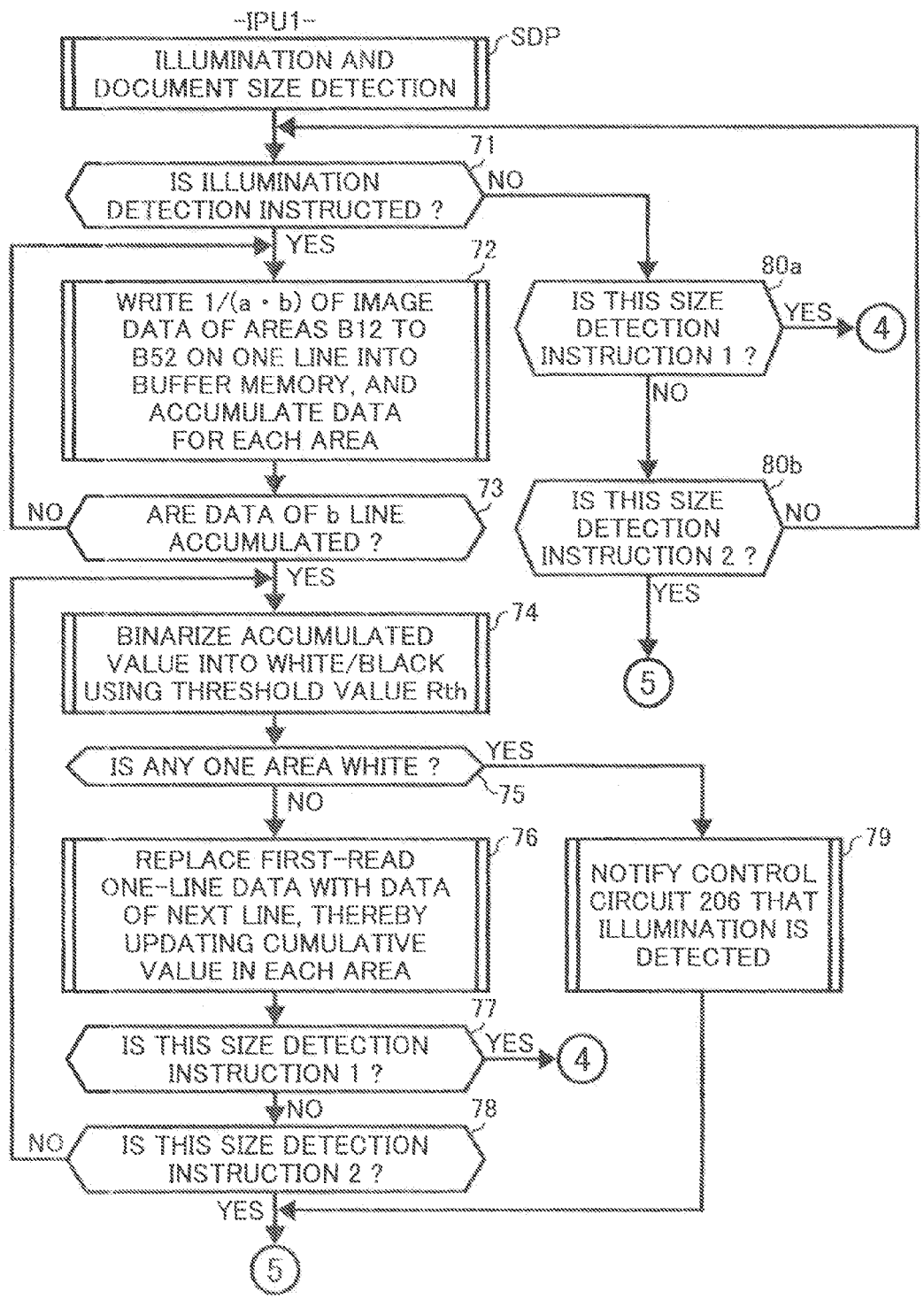
FIG. 11 is a flowchart of the contents of "illumination detection" (SDP) of the IPU shown in FIG. 5.

FIG. 11 depicts the content of the "illumination detected" (SDP) by the IPU 1 in response to the "illumination detection instruction" (61). Upon receiving the "illumination detection instruction" (61), the IPU 1 accumulates and writes 1/(a·b) of the image data of the lines of the reading parts B11 to B51 and B12 to B52 shown in FIG. 13, into the RAM 8 to the RAM 17 corresponding to the parts of the buffer memories BMs, with reference to a frame gate signal FGATE, a line synchronization signal LSYNC, and a pixel synchronization clock CLK generated by the signal-processing-timing control circuit 213. In other words, the image data is added to a written value, and the added result is updated and written (71, 72). The "a" denotes a width (number of pixels) of each part in the main scanning direction, and b denotes a length (number of pixels=number of lines) of each part in the sub-scanning direction. Both a and b are powers of two. When the accumulation of the b lines is established, the accumulated value of each part is binarizes using a threshold value Rth. The image data is a high value at a white level. Binary data (one bit) "1" (white) is allocated to parts equal to or larger than the threshold value. Binary data "0" (black) is allocated to parts less than the threshold value (74). When a certain part is "1" (white), the IPU 1 notifies the scanner control circuit 206 of the illumination detected state as the optimum illumination light intensity (79).

When all parts are "0" (black), the IPU 1 waits for the arrival of the image data of the next line. When the image data of the next line arrives, the IPU 1 accumulates 1/(a·b) of the image data of the lines at each part, and adds the accumulated value this time to accumulated data (b−1)/b held at each part. The IPU 1 updates the old one line of the accumulated value within the part, using the sum obtained by the addition as the accumulated value of the part (76), and binarizes the updated line. When any part is "1" (white), the IPU 1 notifies the scanner control circuit 206 of the illumination detected state as the optimum illumination light intensity (79).

Figure 12:
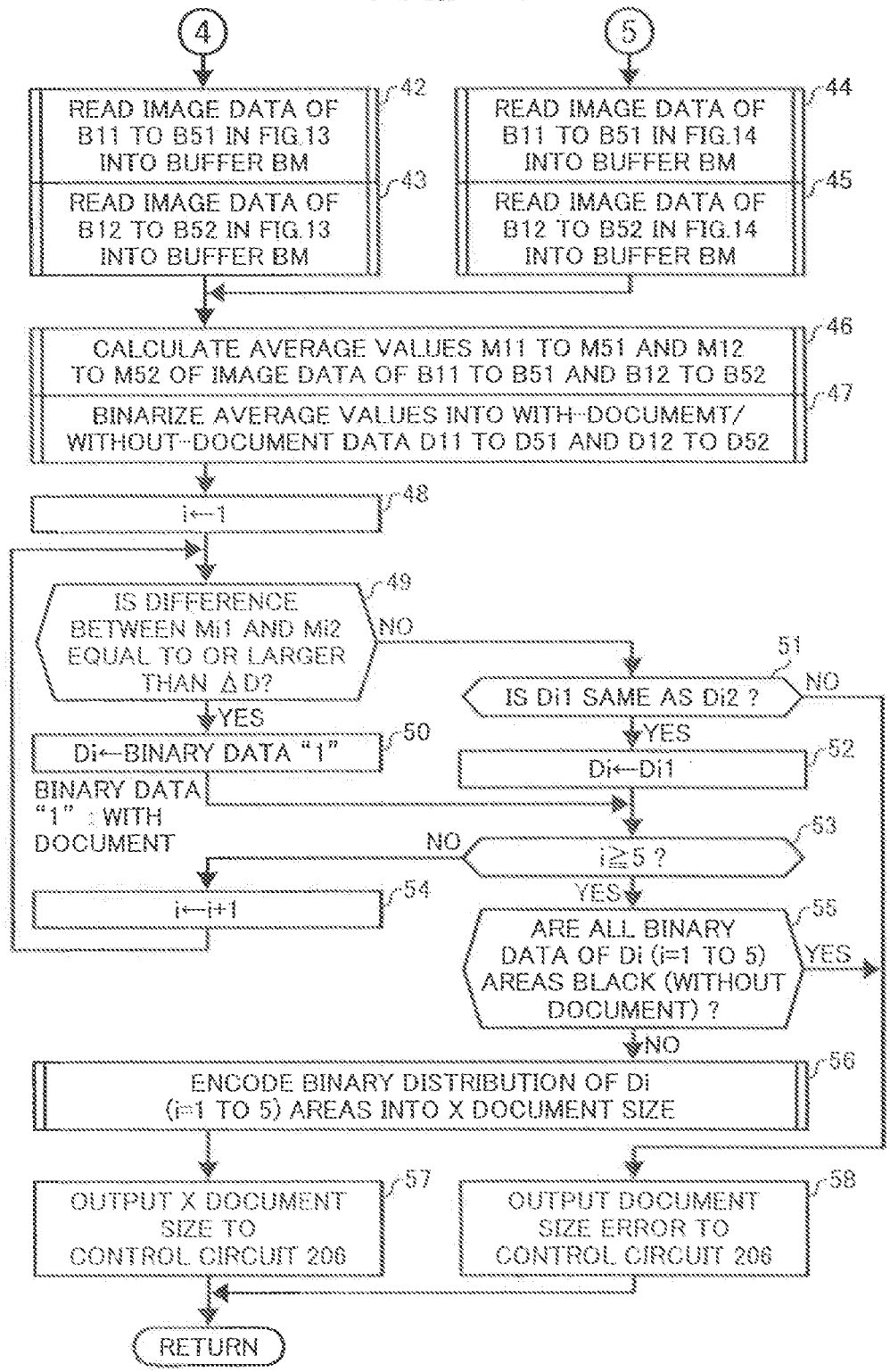
FIG. 12 is a flowchart of the contents of "X document size detection" (SDP) of the IPU shown in FIG. 5.

Regardless of whether the illumination detection state is notified to the scanner control circuit 206, when "size detection instruction 1" (13) or "size detection instruction 2" (15) is given from the scanner control circuit, the IPU 1 proceeds to "X document size detection" (SDP) shown in FIG. 12.

At the "X document size detection" (SDP) shown in FIG. 12, when the IPU 1 receives the "size detection instruction 1" (13), the IPU 1 writes image data of the reading parts B11 to B51 and B12 to B52 shown in FIG. 13 into the RAM 8 to the RAM 17 corresponding to the parts in the buffer memories BMs, with reference to the frame gate signal FGATE, the line synchronization signal LSYNC, and the pixel synchronization clock CLK generated by the signal-processing-timing control circuit 213 (41 to 43). When the IPU 1 receives the "size detection instruction 2" (15), the IPU 1 writes image data of the reading parts B11 to B51 and B12 to B52 shown in FIG. 14 into the RAM 8 to the RAM 17 corresponding to the parts in the buffer memories BMs (41, 44, 45).

The IPU 1 shading corrects the image data stored in each of the RAM 8 to the RAM 17, calculates average values M11 to M51 and M12 to M52 (average values of each part) of the shading-corrected image data (46), and saves the average values in the register (46). The IPU 1 binarizes each average value into with-document/without-document data D11 to D51 and D13 to D52, and saves the binary data into the register (47). The shading correction is carried out by giving a pixel position of the image data to be corrected (x position) to a shading correction LUT, reading the gain stored in the LUT to the destination of the x position, and multiplying the gain to the image data to be corrected.

The IPU 1 then calculates average values Mi1 and Mi2 (where i=1 to 5) of the same part in the main scanning direction. Binary data Di (i=1 to 5) destined to the main scanning position i of the part where a difference is equal to or larger than a set value ΔD is set to "1" that indicates presence of the document (49, 50). Regarding the part where the difference is less than the setting value AD, when Di1 is the same as Di2, the binary data Di1 of this part is written into binary data Di allocated to the part i (51, 52). When Di1 is not the same as Di2, a failure of the X document size detection is notified to the scanner control circuit 206 (58). The process performed by the scanner control circuit 206 in response to this is already explained at the part relevant to step 19 shown in FIG. 8. When binary data is written into all Di (i=1 to 5), the IPU 1 notifies the scanner control circuit 206 of the failure in the detection of the X document size, when all binary data is "0" (black: no document) (55 to 58). Otherwise, the IPU 1 encodes the distribution of the binary data Di (i=1 to 5) in the main scanning direction of "1"/"0" into the X document size data, and transmits the X document size data to the scanner control circuit 206 (56, 57).

A hardware configuration of a multifunction copy machine according to a second embodiment of the present invention is the same as that according to the first embodiment shown in FIGS. 1 to 7. While a large part of the function of each part is the same as that according to the first embodiment, the "X document size detection" (SDP) executed by the IPU 1 in the second embodiment is different from that according to the first embodiment shown in FIG. 12.

Figure 15A:
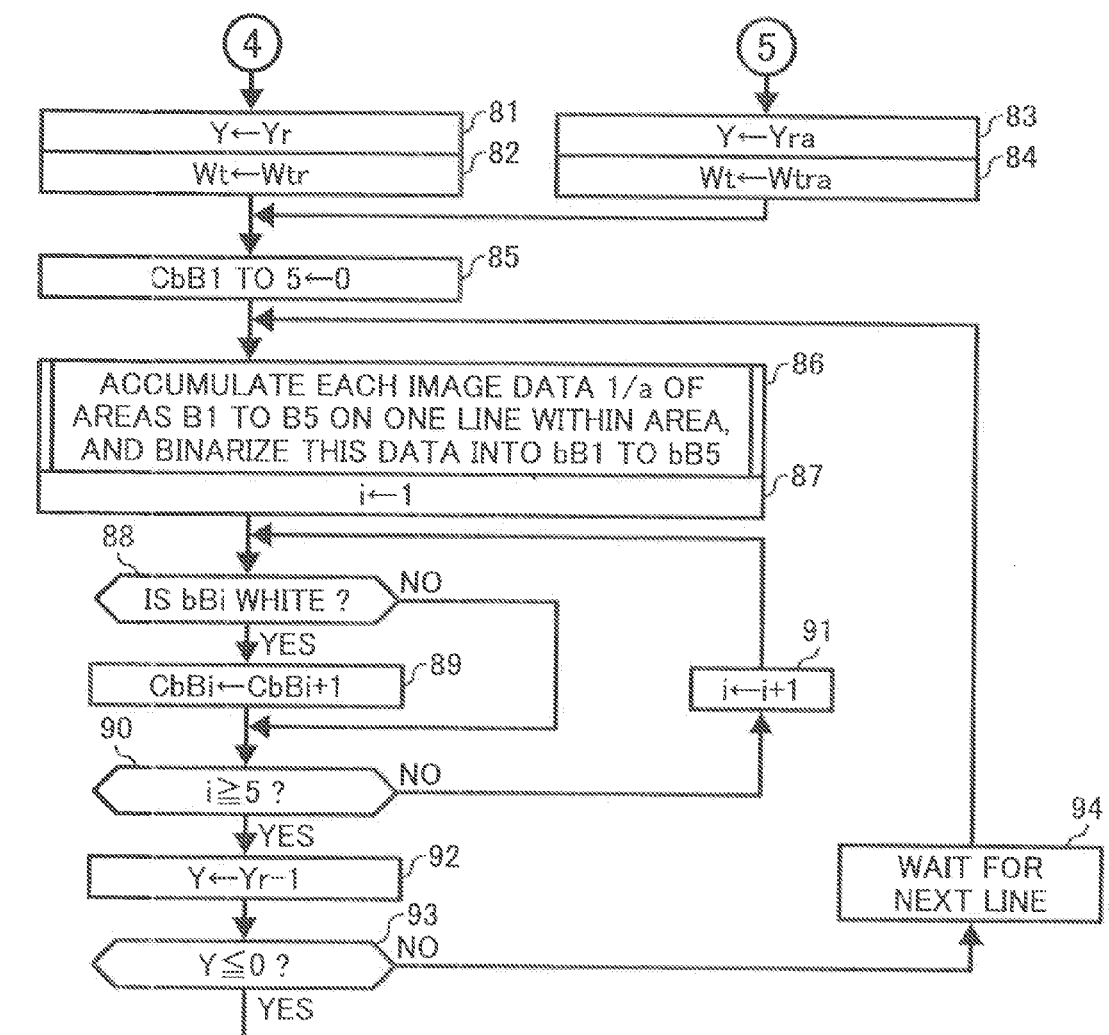
FIG. 15 is a flowchart of the contents of "X document size detection" (SDP) of the IPU according to a second embodiment of the present invention.
Figure 15B:
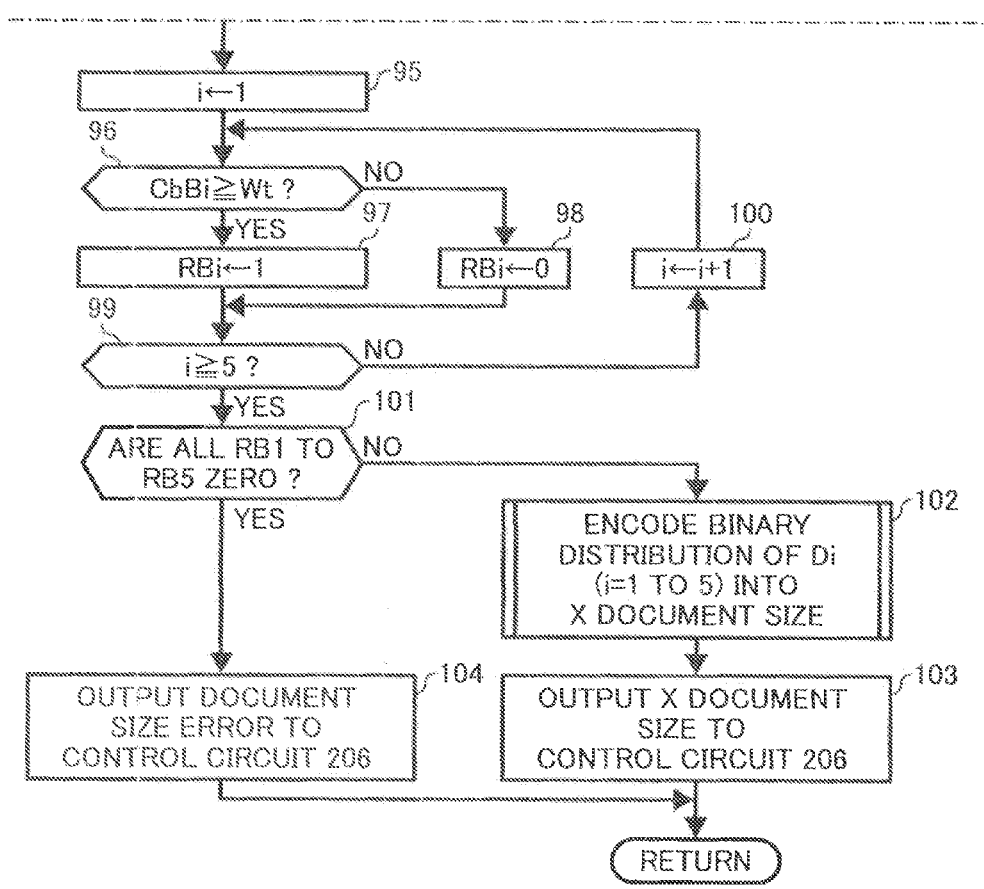
Figure 16:
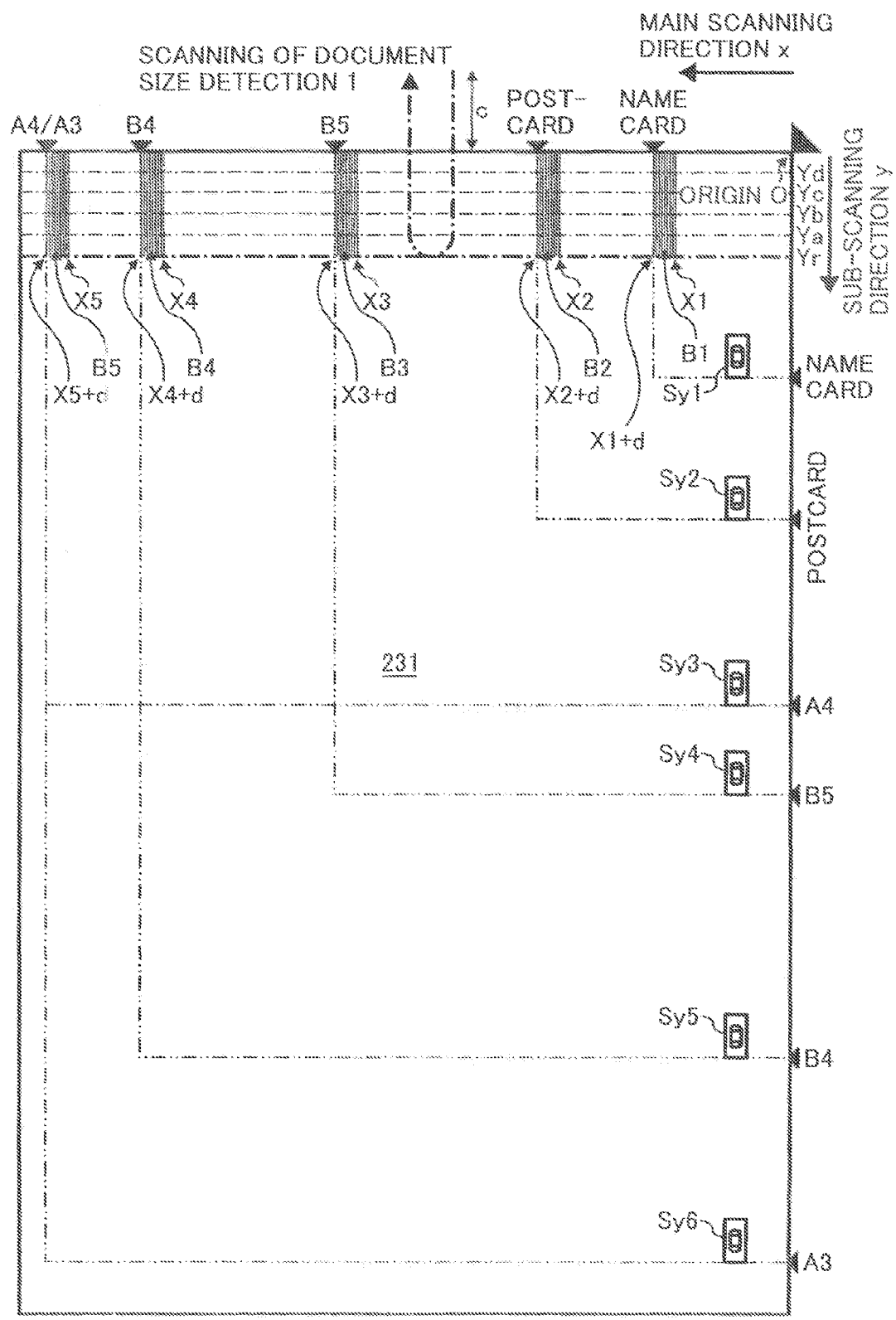
FIG. 16 is an enlarged top-plan view of the contact glass shown in FIG. 3, covering parts at which image data is extracted in a first detection of a document size according to the second embodiment.
Figure 17:
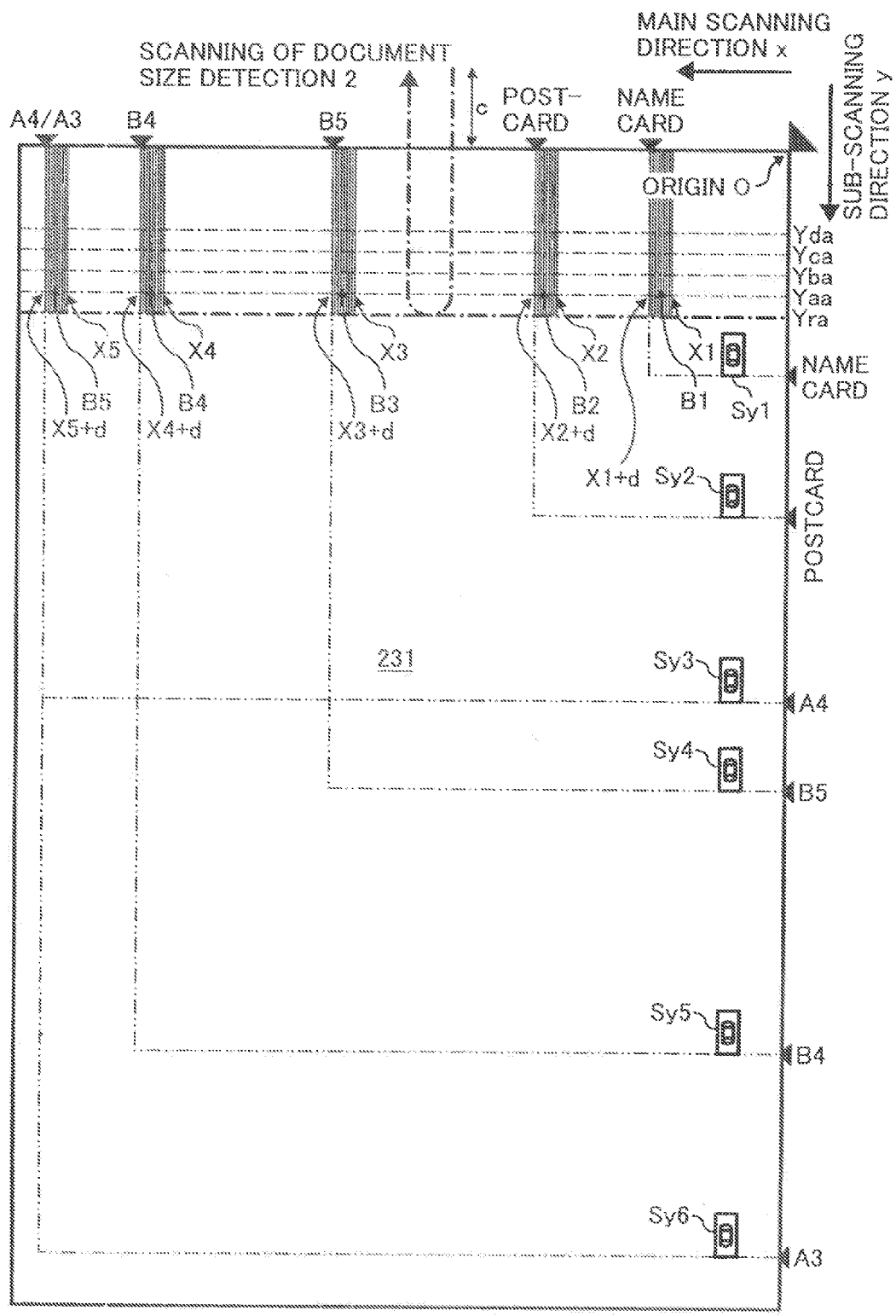
FIG. 17 is an enlarged top-plan view of the contact glass shown in FIG. 3, covering parts at which image data is extracted in a second detection of a document size according to the second embodiment.

FIG. 15 depicts the content of the "X document size detection" (SDP) executed by the IPU 1 according to the second embodiment. Upon receiving the "size detection instruction 1" (13), the IPU 1 writes the starting point data Yr of the reading parts B1 to B5 in the sub-scanning direction shown in FIG. 16 into a line-number register Y (81), and writes a value Wtr (a set value) corresponding to Yr into a white determination threshold value register Wt (82). Upon receiving the "size detection instruction 2" (15), the IPU 1 writes starting point data Yra of the reading parts B1 to B5 in the sub-scanning direction shown in FIG. 17, into the line number register Y (83), and writes a value Wtra (a set value) corresponding to Yra into the white determination threshold value register Wt (84).

The IPU 1 clears count registers CbB1 to 5 (85), accumulates 1/a of the image data on one line within the part for each of the parts B1 to B5, and binarizes the values using a threshold value (a set value) for determining the white level, with reference to the frame gate signal FGATE, the line synchronization signal LSYNC, and the pixel synchronization clock CLK generated by the signal-processing-timing control circuit 213. In other words, the IPU 1 determines whether one line within the part is "white" (86). The IPU 1 increments by one (counts up by one) in the counter register bBi allocated to the part Bi (1=1 to 5) at which the determination of "white" is made, with reference to determinations made at the parts B1 to B5 (87 to 90). In other words, the IPU 1 adds one to the data of the register, and updates the value in the register using the obtained sum data.

The IPU 1 then decrements by one (counts down by one) the data in the line number register Y (92). In other words, the IPU 1 subtracts one from the data of the register Y, and updates the value in the register using the obtained rest data. The IPU 1 then checks whether the rest data is equal to or less than zero. When the rest data is not zero, the IPU 1 determines whether the one line image data within each part is white in a similar manner, after waiting for the arrival of the image data of the next line (86). The IPU 1 increments by one the count register bBi allocated to the part where a determination of white is made (87 to 90). The IPU 1 repeats this processing until when the data of the register Y becomes zero. In other words, the IPU 1 counts up the number of white lines at each of the parts B1 to B5 from the reading starting point Yr or Yra of the image data to the end point (the document image reading starting point: the origin zero) of the image data for the document size determination shown in FIG. 16 or 17, and writes the count-up data into the count registers CbB1 to 5 (86 to 94).

After ending this processing, the IPU 1 binarizes the count values of the count registers CbBV1 to 5 into binary data ("1": white/"0": black) that indicates whether the parts B1 to B5 are white or black, using the threshold value Wt of the threshold value register Wt. The IPU 1 writes the binary data into white and black determination registers RB1 to RB5 corresponding to each part (95 to 100). When all the binary data in the white and black determination registers RB1 to RB5 show "0" (black), the IPU 1 notifies the scanner control circuit 206 about the failure in the detection of the X document size (101, 104). Otherwise, the IPU 1 encodes the distribution of the binary data Di (i=1 to 5) of the white and black determination registers RB1 to RB5 in the main scanning direction of "1"/"0" into the X document size data, and transmits the X document size data to the scanner control circuit 206 (102, 103). Other functions and processes according to the second embodiment are similar to those according to the first embodiment.

A hardware configuration of a multifunction copying machine according to a third embodiment of the present invention is the same as that according to the first embodiment shown in FIGS. 1 to 7. While a large part of the function of each part is the same as that according to the first embodiment shown in FIGS. 1 to 7, the "reading control" (RCP) executed by the scanner control circuit 206 according to the third embodiment is different from that according to the first embodiment shown in FIGS. 8 and 9.

Figure 18A:
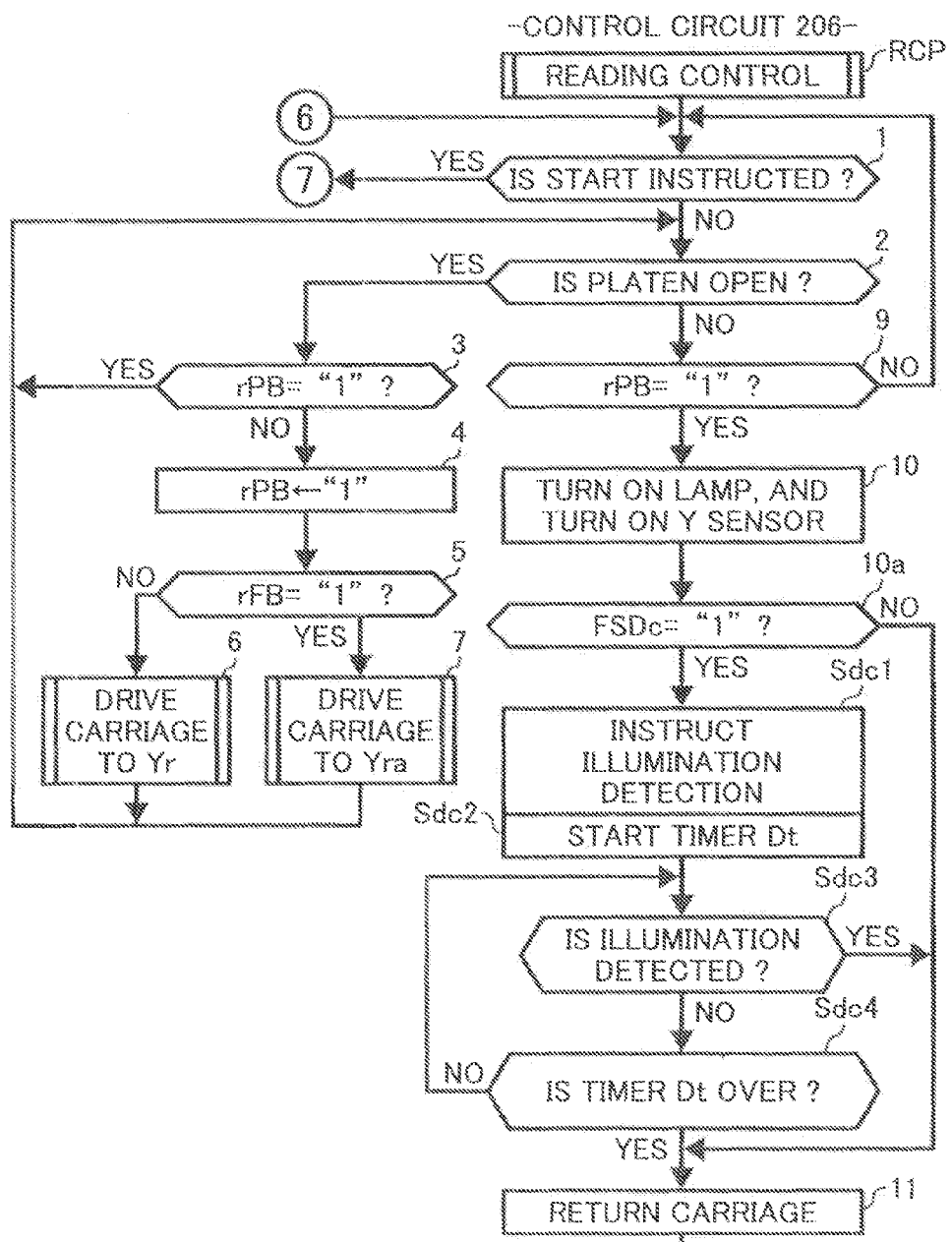
FIG. 18 is a flowchart of a part of an outline of the contents of "reading control" (RCP) of the scanner control circuit according to a third embodiment of the present invention.
Figure 18B:
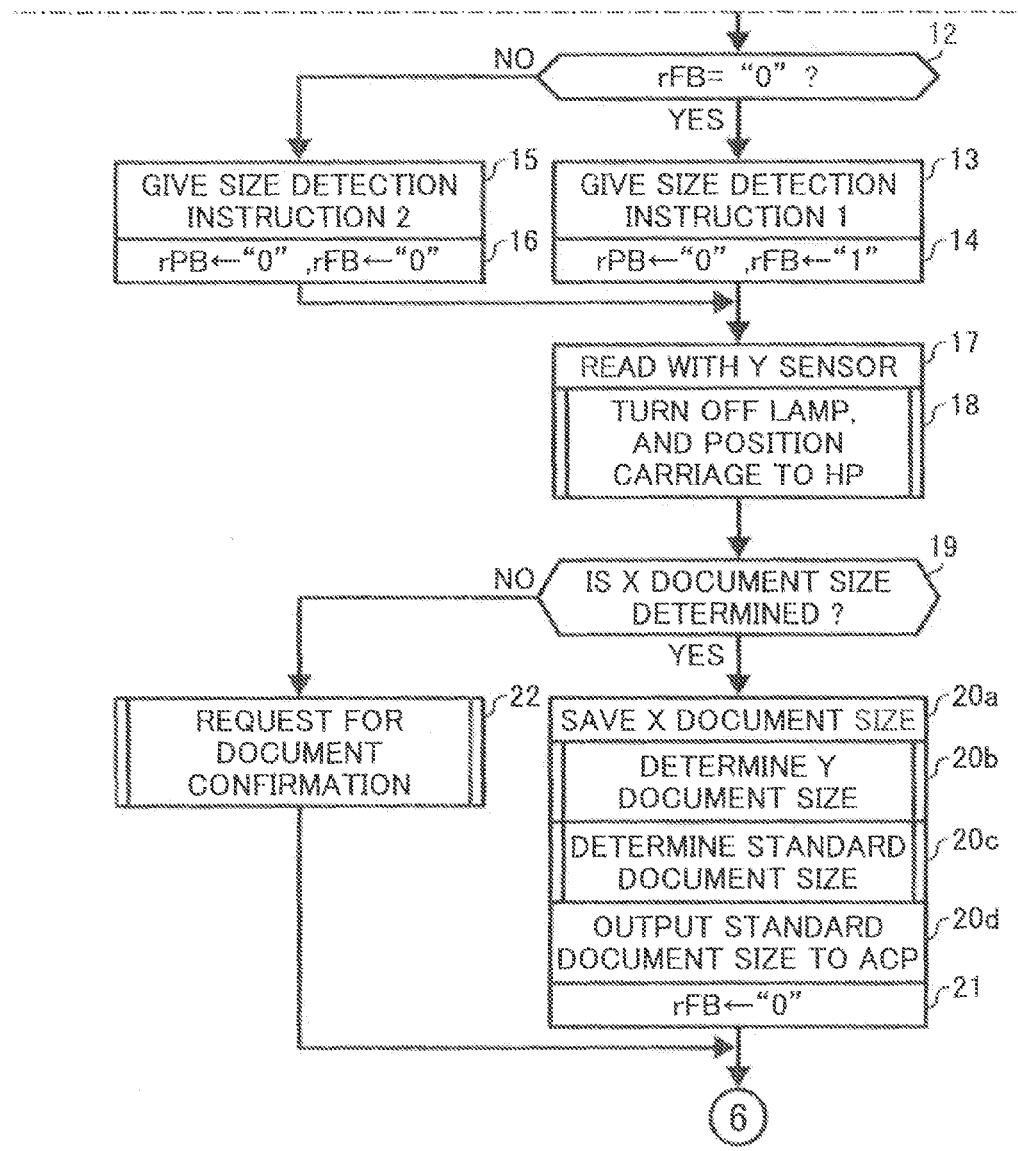

FIGS. 18 and 19 depict the content of the "reading control" (RCP) executed by the scanner control circuit 206 according to the third embodiment. In place of the "size reading timing adjustment" (SDT) according to the first embodiment shown in FIG. 8, steps Sdc1 to Sdc4 shown in FIG. 18 are added, and the "timing data updating" (TDA: FIG. 8) concerning the "size reading timing adjustment" (SDT) (Sta: FIG. 9) is deleted.

According to the third embodiment, the scanner control circuit 206 refers to the assignment information FSDc of the register FSDc (10*a*). When the assignment information FSDc is "0" for assigning the "instantaneous instruction of document size detection", the first carriage is returned immediately (11), and the "size detection instruction 1" is given to the IPU 1 via the signal-processing-timing control circuit 213 (12, 13). However, when the assigned information FSDc is "1" for instructing the "rise detection mode", the scanner control circuit 206 instructs the IPU 1 to execute the "illumination detection" (Sdc1), and starts the timer of the marginal time (a set value) Dt (Sdc2). The scanner control circuit 206 waits for the notification of the "illumination detected" (Sdc3) from the IPU 1. When the IPU 1 notifies the "illumination detected", the scanner control circuit 206 returns the first carriage (11). When the IPU 1 does not notify the "illumination detected" and when the time of a timer Dt is over, the scanner control circuit 206 returns the first carriage (11).

As explained above, according to the third embodiment, the delay time Td from the start of the lamp lighting until the "illumination detected" and the light-off time Tr are not measured, and the detection and the control of the timing of the carriage return driving are simplified. Other functions and processes according to the third embodiment are similar to those according to the first embodiment.

According to the present invention, the rise of the document illumination light intensity is automatically detected. After this detection, the size detector IPU 1 reads the image signal of the imaging element, determines presence of the document in the main scanning direction, and determines the document size in the main scanning direction. Therefore, possibility of failure in the detection of the document size due to the shortage of light intensity decreases. In other words, reliability of the document size detection improves. Furthermore, when the rise of the document illumination light intensity is quick, the detection of the document size ends early. Therefore, the document reading scan can be started quickly.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A document reading apparatus comprising:
a translucent plate;
a platen that presses a document against the translucent plate;
an illumination lamp that illuminates the document;
a driving unit that drives the illumination lamp in a sub-scanning direction;
an imaging element that reads the document in a main scanning direction, and line-outputs an image signal;
an optical unit that projects a document image illuminated by the illumination lamp to the imaging element;
an opening detector that detects a state of the platen whether the platen is "opened" at a level equal to or above a set opening degree or "closed" at a level less than the set opening degree;
a reading controller that starts lighting of the illumination lamp in response to a change of the state of the platen from the "opened" to the "closed";
a rising detector that detects a rising of light intensity of the illumination lamp; and
a size detector that reads the image signal of the imaging element after the rising detector detects a rising of the light intensity, determines a presence of the document in the main scanning direction, and decides a document size in the main scanning direction.

2. The document reading apparatus according to claim 1, further comprising:
a storing unit that counts an elapsed-time from starting the lighting of the illumination lamp until detecting the rising by the rising detector, and stores the elapsed-time with a predetermined environmental condition, wherein the reading controller instructs the size detector to detect the document size, after the stored elapsed-time from starting the lighting of the illumination lamp.

3. The document reading apparatus according to claim 2, wherein
the reading controller instructs the size detector to detect the document size in response to the rising of the light intensity detected by the rising detector, and when a time elapsed from starting the lighting of the illumination lamp has reached the elapsed-time stored in the storing unit until the time when the rising detector detects the rising of the light intensity, instructs the size detector to detect the document size.

4. The document reading apparatus according to claim 2, wherein
the predetermined environmental condition is a light-off time until starting of the lighting of the illumination lamp.

5. The document reading apparatus according to claim 1, further comprising:
a setting unit that sets information to instruct a timing control of detecting the document size based on an input by an operator in a memory, and erases the information from the memory, wherein
when the information is not set, the reading controller instructs the size detector to detect the document size at the time of starting the lighting of the illumination lamp, and
the size detector reads, in response to the instruction to detect the document size, the image signal of the imaging element, determines the presence of the document in the main scanning direction, and decides the document size in the main scanning direction.

6. The document reading apparatus according to claim 1, wherein
the reading controller controls the driving unit to drive the illumination lamp to a first setting position in the sub-scanning direction in a document mounting area on the translucent plate, in response to the change of the state of the platen from "closed" to "opened", and at the time of instructing the size detector to detect the document size, the reading controller controls the driving unit to drive the illumination lamp to return.

7. The document reading apparatus according to claim 6, wherein
the first setting position is within an area of a minimum document size decided by the document reading apparatus.

8. The document reading apparatus according to claim 6, wherein
the size detector reads the image signal of the imaging element at a plurality of positions in the sub-scanning directions, during driving of the illumination lamp to return, collates the image signals at a plurality of positions in the sub-scanning direction at a same position in the main scanning direction, determines the presence of the document at each of the positions in the main scanning direction, and decides the document size in the main scanning direction.

9. The document reading apparatus according to claim 6, wherein
the size detector calculates an average value of image data obtained by digitally converting the image signal at each of a plurality of positions, and collates average values at the positions in the sub-scanning direction at a same position in the main scanning direction.

10. The document reading apparatus according to claim 6, wherein
the size detector reads the image signals at a plurality of positions in the main scanning direction repetitively at a predetermined pitch in the sub-scanning direction during driving the illumination lamp to return, detects whether each line within each of the positions is white having a reflection of the illumination light, counts a number of lines that are detected as white at each of the positions, converts a count value at each of the positions into a binary value expressing presence or absence of the document, and decides the document size in the main scanning direction by referring to presence or absence of the document at each of the positions.

11. The document reading apparatus according to claim 6, wherein
the size detector converts image data obtained by digitally converting the image signal at each of a plurality of positions into binary data that expresses presence of the document or absence of the document, and when the binary data at the positions in the sub-scanning direction at a same position in the main scanning direction coincide at each position in the main scanning direction, decides the document size in the main scanning direction based on a distribution of the binary data in the main scanning direction.

12. The document reading apparatus according to claim 11, further comprising:
a notifying unit that notifies, when the binary data does not coincide with each other at the positions in the sub-scanning direction at a same position in the main scanning direction, a document confirmation request.

13. The document reading apparatus according to claim 12, wherein
during driving the illumination lamp to return after the document confirmation request is notified, the size detector reads the image signals at a plurality of positions in the sub-scanning direction different from the positions in the sub-scanning direction in which the image signal is already read during driving the illumination lamp to return before the document confirmation request is notified, and determines the presence of the document at each position in the main scanning direction.

14. The document reading apparatus according to claim 6, wherein
the size detector determines that the document is present when a difference of the image signals at a plurality of positions in the sub-scanning direction at a same position in the main scanning direction is equal to or larger than a set value.

15. The document reading apparatus according to claim 6, wherein
when a difference of the image signals at a plurality of positions in the sub-scanning direction at a same position in the main scanning direction is equal to or larger than a set value, the size detector converts data corresponding to the positions into first binary data that expresses presence of the document, converts image data obtained by digitally converting the image signal at the positions in the sub-scanning direction at other position in the main scanning direction into second binary data that expresses presence or absence of the document, and when the first binary data coincides with the second binary data at each position in the main scanning direction, decides the document size in the main scanning direction based on a distribution of binary data in the main scanning direction at each position in the main scanning direction.

16. The document reading apparatus according to claim 15, further comprising:
a notifying unit that notifies, when the first binary data does not coincide with the second binary data at the positions in the sub-scanning direction at a same position in the main scanning direction, a document confirmation request.

17. The document reading apparatus according to claim 16, wherein
during driving the illumination lamp to return after the document confirmation request is notified, the size detector reads the image signals at a plurality of positions in the sub-scanning direction different from the positions in the sub-scanning direction in which the image signal is already read during driving the illumination lamp to return before the document confirmation request is notified, and determines the presence of the document at each position in the main scanning direction.

18. The document reading apparatus according to claim 1, wherein
when document size data is available at the time of receiving a document reading instruction, the reading controller controls the driving unit to drive the illumination lamp to a sub-scanning inverting position corresponding to the document size, and drive the illumination lamp to return from the sub-scanning inverting position to a waiting position at which the reading instruction is awaited.

19. The document reading apparatus according to claim 1, further comprising:
a Y sensor that detects the presence of the document at a plurality of positions in the sub-scanning direction on the translucent plate, wherein
the reading controller reads a detection signal of the Y sensor in response to a change of the state of the platen from the "opened" to the "closed", and
the size detector decides a total size of the document based on a combination of decided document size in the main scanning direction and presence or absence of the document at the positions in the sub-scanning direction detected by the Y sensor.

20. The document reading apparatus according to claim 1, wherein
the rising detector detects the rising of the light intensity of the illumination lamp based on the image signal of the imaging element.

21. The document reading apparatus according to claim 1, further comprising:
a translucent window that is illuminated with the illumination lamp at a home position; and
a document feeder that shifts a sheet-shaped document so as to pass through the translucent window in the sub-scanning direction, wherein
the reading controller fixes the illumination lamp to the home position, and selectively executes one of a sheet-through reading mode of reading the image from the shifted sheet-shaped document and a flatbed reading mode of driving the illumination lamp to the sub-scanning direction along the translucent plate.

22. The document reading apparatus according to claim 21, wherein
when the document mounting detector does not detect the presence of the document at the time of receiving a document reading instruction, the reading controller executes the flatbed reading mode.

23. The document reading apparatus according to claim 21, further comprising:
a document mounting detector that detects presence of the document on a document tray, wherein
when the document mounting detector detects the presence of the document at the time of receiving a document reading instruction, the reading controller executes the sheet-through reading mode.

24. An image processing apparatus comprising:
an image reading device including
a translucent plate;
a platen that presses a document against the translucent plate;
an illumination lamp that illuminates the document;
a driving unit that drives the illumination lamp in a sub-scanning direction;
an imaging element that reads the document in a main scanning direction, and line-outputs an image signal;
an optical unit that projects a document image illuminated by the illumination lamp to the imaging element;
an opening detector that detects a state of the platen whether the platen is "opened" at a level equal to or above a set opening degree or "closed" at a level less than the set opening degree;
a reading controller that starts lighting of the illumination lamp in response to a change of the state of the platen from the "opened" to the "closed";
a rising detector that detects a rising of light intensity of the illumination lamp; and
a size detector that reads the image signal of the imaging element after the rising detector detects the rising of the light intensity, determines a presence of the document in the main scanning direction, and decides a document size in the main scanning direction;
a memory unit that stores image data; and
an image data processor that stores the image data output from the image reading device into the memory unit, and reads the image data from the memory unit.

25. An image forming apparatus comprising:
an image reading device including
a translucent plate;
a platen that presses a document against the translucent plate;
an illumination lamp that illuminates the document;
a driving unit that drives the illumination lamp in a sub-scanning direction;
an imaging element that reads the document in a main scanning direction, and line-outputs an image signal;
an optical unit that projects a document image illuminated by the illumination lamp to the imaging element; an opening detector that detects a state of the platen whether the platen is "opened" at a level equal to or above a set opening degree or "closed" at a level less than the set opening degree;
a reading controller that starts lighting of the illumination lamp in response to a change of the state of the platen from the "opened" to the "closed";
a rising detector that detects a rising of light intensity of the illumination lamp; and
a size detector that reads the image signal of the imaging element after the rising detector detects the rising of the light intensity, determines a presence of the document in the main scanning direction, and decides a document size in the main scanning direction; and
a printer that prints an image formed by image data read by the image reading apparatus on a recording medium.

* * * * *